(12) United States Patent
Eguchi

(10) Patent No.: US 8,542,447 B2
(45) Date of Patent: Sep. 24, 2013

(54) PHOTOGRAPHIC OPTICAL SYSTEM AND IMAGE PICKUP APPARATUS HAVING THE SAME

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/412,454

(22) Filed: Mar. 5, 2012

(65) Prior Publication Data

US 2012/0229921 A1 Sep. 13, 2012

(30) Foreign Application Priority Data

Mar. 9, 2011 (JP) ................................. 2011-051367

(51) Int. Cl.
*G02B 15/14* (2006.01)

(52) U.S. Cl.
USPC ............................. 359/689; 359/690; 359/784

(58) Field of Classification Search
USPC ................. 359/686–690, 754–760, 763–769, 359/771–780, 784–792; 396/72–88; 348/240.99–240.3, 333.01–369
See application file for complete search history.

(56) References Cited

U.S. PATENT DOCUMENTS

| | | | |
|---|---|---|---|
| 5,745,306 A | 4/1998 | Sato | |
| 5,757,555 A | 5/1998 | Sato | |
| 7,193,789 B2 | 3/2007 | Maetaki | |
| 7,426,083 B2 | 9/2008 | Endo | |
| 2008/0130141 A1* | 6/2008 | Ishibashi | 359/774 |

* cited by examiner

*Primary Examiner* — Darryl J Collins
*Assistant Examiner* — Gary O'Neill
(74) *Attorney, Agent, or Firm* — Canon U.S.A., Inc. IP Division

(57) ABSTRACT

A photographic optical system includes, in order from an object side to an image side, a first lens unit having a positive refractive power, a second lens unit having a positive or negative refractive power, and a third lens unit having a positive or negative refractive power, focusing being performed by moving the second lens unit, wherein at least one diffractive optical element and at least one optical element made of solid material are provided closer to the object side than a position where a paraxial chief ray intersects an optical axis, and wherein a focal length obtained by only a diffraction component of the diffractive optical element, a focal length of the optical element made of solid material, a focal length of the first lens unit, and a relative anomalous partial dispersion of a material forming the optical element made of solid material are appropriately set.

13 Claims, 20 Drawing Sheets

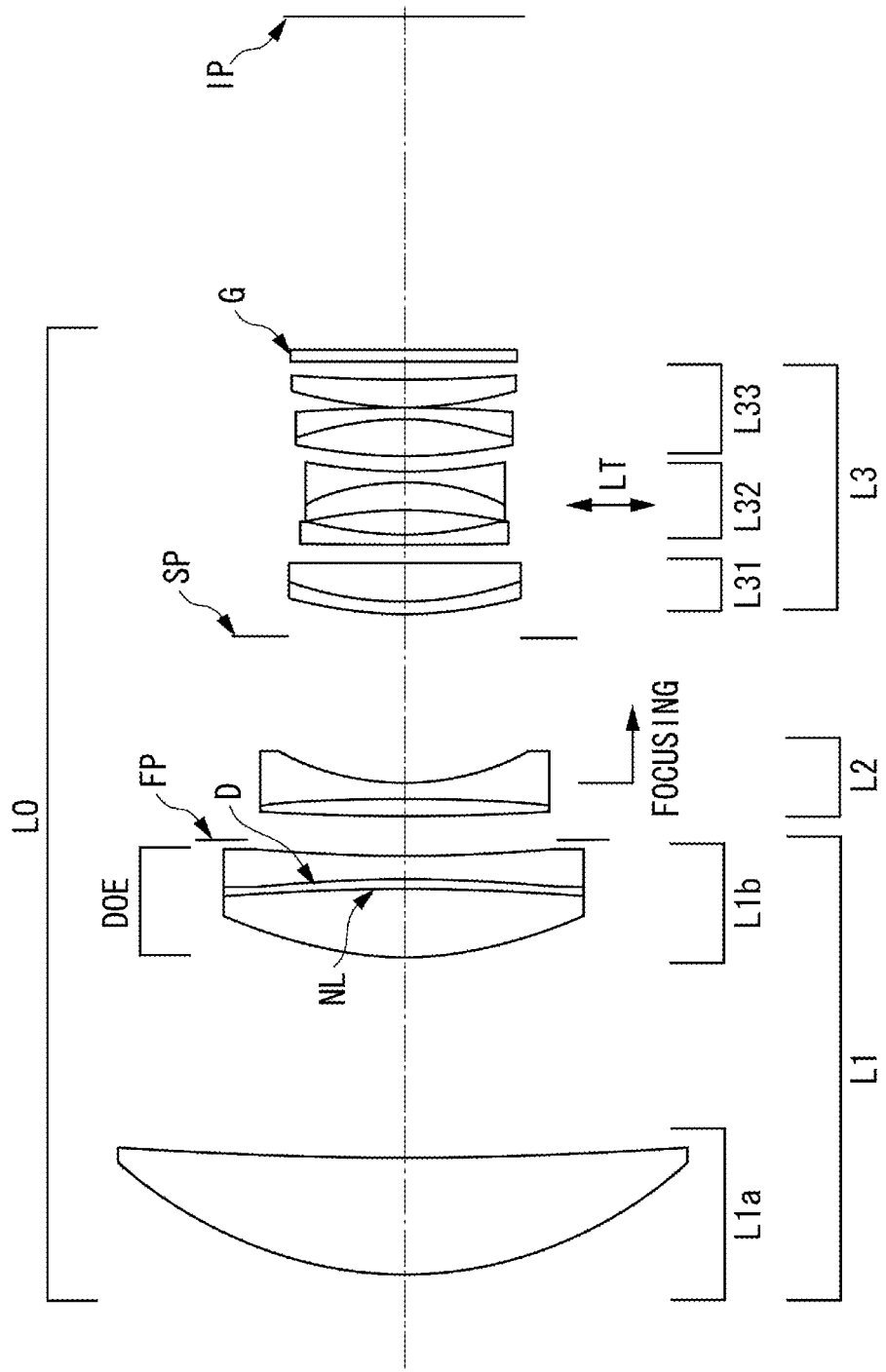

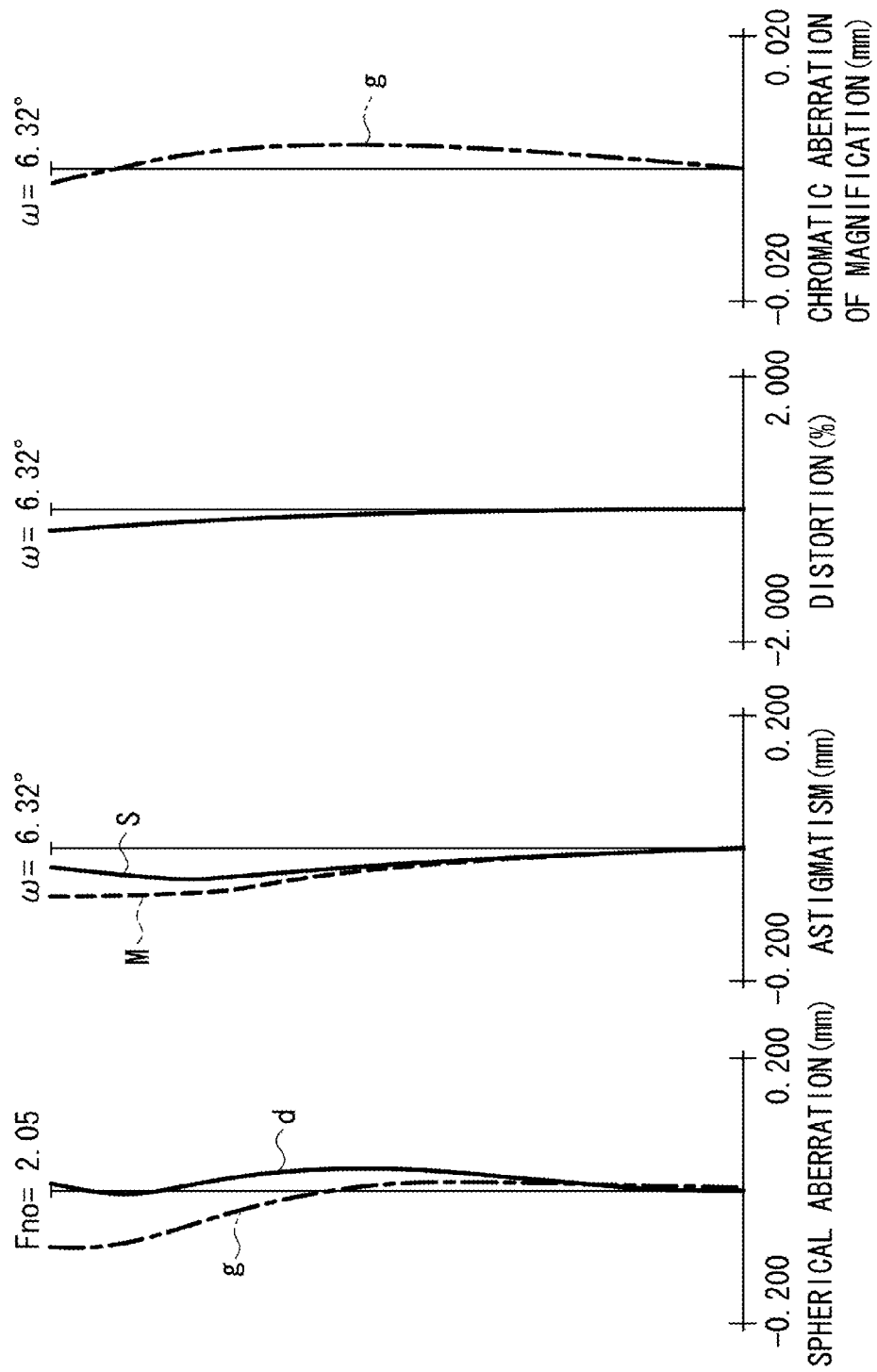

PHOTOGRAPHIC OPTICAL SYSTEM AND IMAGE PICKUP APPARATUS HAVING THE SAME

BACKGROUND OF THE INVENTION

1. Field of the Invention

The present invention is directed to a photographic optical system and an image pickup apparatus having the same, which are particularly suitable for a video camera, a digital still camera, a TV camera, a monitoring camera, a silver-halide film camera, and the like.

2. Description of the Related Art

In the related art, as a photographic optical system having a long focal length, there is a known telephoto type of photographic optical system (telephoto lens) including a front lens unit having a positive refractive power and a rear lens unit having a negative refractive power disposed in order from an object side to an image side. In general, regarding a telephoto lens having a long focal length, there is a tendency that chromatic aberration, especially axial chromatic aberration and chromatic aberration of magnification, among various aberrations deteriorates as the focal length is increased.

There is a known telephoto lens of which chromatic aberration is corrected (removed) by a combination of a positive lens formed by using a low-dispersion material having an anomalous partial dispersion property, such as fluorite or FK01 (trade name, manufactured by OHARA INC.) and a negative lens formed by using a high-dispersion material. U.S. Pat. No. 5,757,555 discusses an inner-focus type of telephoto lens having a focal length of about 300 mm and an F-number of about 4.

In addition, in general, with respect to a telephoto lens having a small F-number, there is a tendency that especially spherical aberration and coma among various aberrations deteriorate as the F-number is decreased. As a method of correcting spherical aberration, coma, or the like of such a telephoto lens having a small F-number, there is a method of increasing a degree of freedom with respect to correction of aberration by increasing the number of lens elements. There is a known telephoto lens of which spherical aberration or coma is reduced according to this method. U.S. Pat. No. 5,745,306 discusses a large-aperture-ratio inner-focus type of telephoto lens having a focal length of about 300 mm and an F-number of about 2.8.

On the other hand, as a method of correcting various aberrations of an optical system including chromatic aberration, and of reducing lens weight, there is a method which uses a diffractive optical element in which, on a lens surface or in a portion of the optical system, a diffractive optical portion having a diffraction function provided on a substrate is installed. There is known an optical system having a reduced total lens weight which is achieved by decreasing the total lens length while correcting chromatic aberration in the way described above and by forming the lens using a glass material having a relatively low specific gravity. U.S. Pat. No. 7,426,083 discusses a large-aperture-ratio telephoto lens having a focal length of about 500 mm and an F-number of about 4. In U.S. Pat. No. 7,426,083, the correction of chromatic aberration and the reduction of total weight are contrived by decreasing the total lens length and using a glass material having a relatively low specific gravity for a positive lens of a front lens unit.

In addition, as a method of correcting chromatic aberration of an optical system, there is a method using an optical element made of solid material having a larger anomalous partial dispersion property than a glass material. There is known an optical system of which the total lens weight is reduced by correcting chromatic aberration and decreasing the total lens length according to this method and by configuring the lens using a glass material having a relatively low specific gravity. U.S. Pat. No. 7,193,789 discusses a telephoto type of optical system having a focal length of about 300 mm and an F-number of about 4. In U.S. Pat. No. 7,193,789, the correction of chromatic aberration is achieved by using a solid material having a large anomalous partial dispersion property for an optical element having a positive power in a front lens unit.

In general, in a large number of photographic lenses (optical systems), focusing is performed by moving the entire photographic lens or moving a partial lens unit, a part of the photographic lens. Of the both methods, in the case of a telephoto lens having a long focal length, since the telephoto lens is large in size and heavy, it is difficult to perform focusing by moving the entire telephoto lens in terms of mechanism.

Therefore, in the related art, the telephoto lens performs focusing by moving a partial lens unit of the telephoto lens. The telephoto type of optical system uses an inner focusing system in which focusing is performed by moving a partial lens unit, other than a front lens unit, disposed in a central portion of the optical system which is relatively small and light. All of the above-described telephoto lenses each include a first lens unit having a positive refractive power and a second lens unit having a negative refractive-power that are disposed in order from an object side, and perform focusing by moving a partial lens unit which is a part of the second lens unit along the optical axis.

In the telephoto lenses, to appropriately correct various aberrations including chromatic aberration, it is an effective way to use an optical material having an appropriate anomalous partial dispersion and a low dispersion for a front lens unit having a larger effective diameter and a positive refractive power. In the telephoto lens, when the front lens unit having a positive refractive power has an inappropriate lens configuration, the entire system increases in both size and weight. In addition, with respect to the telephoto lens, since the front lens unit is large and heavy, focusing is not performed by moving the front lens unit. It is fast and effective focusing to use an inner focusing system in which focusing is performed by moving a partial lens unit having a small size and a low weight among lens units instead of the above method.

However, when the inner focusing type is employed in a state where the front lens unit has an inappropriate lens configuration, a variation in aberration, especially, a variation in chromatic aberration increases during focusing, and it is very difficult to compensate for this change.

SUMMARY OF THE INVENTION

The present invention is directed to a photographic optical system which is capable of easily correcting various aberrations including chromatic aberration and which facilitates a reduction in total lens weight of the entire system, and an image pickup apparatus having the photographic optical system. The present invention is also directed to a photographic optical system capable of easily performing focusing and reducing a variation in aberration during focusing and capable of easily obtaining an image having a high quality.

According to an aspect of the present invention, a photographic optical system includes, along an optical axis thereof and arranged in order from an object side to an image side, a first lens unit having a positive refractive power, a second lens unit having a positive or negative refractive power, and a third lens unit having a positive or negative refractive power, focusing being performed by moving the second lens unit in a direction parallel to the optical axis, wherein at least one diffractive optical element and at least one optical element made of solid material are provided closer to the object side than a position where a paraxial chief ray intersects the optical axis, and wherein, when a focal length obtained by only a diffraction component of the diffractive optical element is denoted by fDOE, a focal length of the optical element made of solid material is denoted by fNL, a focal length of the first lens unit is denoted by f1, and a relative anomalous partial dispersion of a material forming the optical element made of solid material is denoted by $\Delta\theta gF_{NL}$, the following conditions are satisfied.

$$10 < fDOE \times fNL/f1^2 < 600$$

$$0.0272 < \Delta\theta gF_{NL} < 0.3000$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are a lens cross-sectional view and an aberration chart of a photographic optical system at an infinitely-distant object distance according to a third exemplary embodiment of the present invention.

DESCRIPTION OF THE EMBODIMENTS

Various exemplary embodiments, features, and aspects of the invention will be described in detail below with reference to the drawings.

Figure 10:
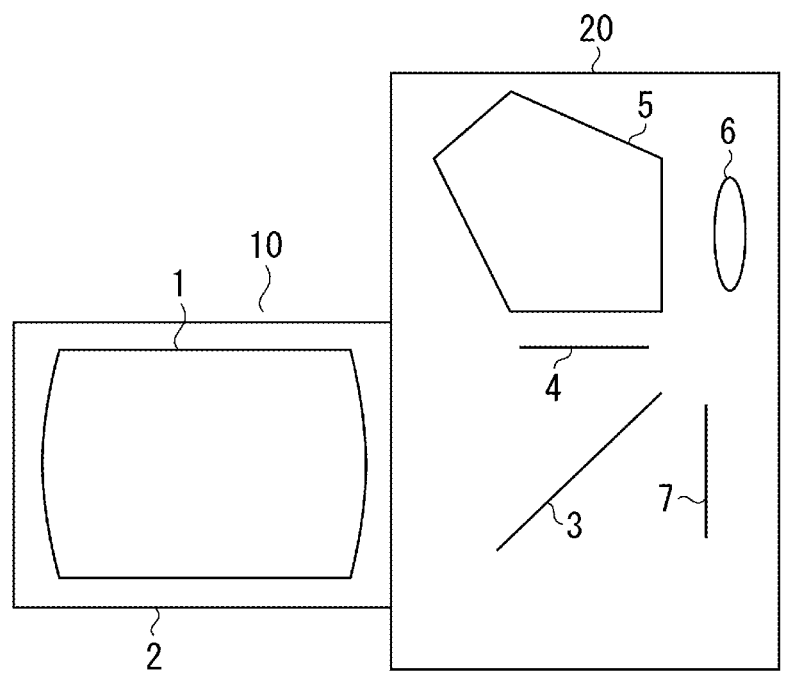
FIG. 10 is an explanatory diagram for describing an image pickup apparatus according to an exemplary embodiment of the present invention.

A photographic optical system according to an exemplary embodiment of the present invention includes, in order from an object side to an image side, a first lens unit having a positive refractive power, a second lens unit having a positive or negative refractive power, and a third lens unit having a positive or negative refractive power. Focusing is performed by moving the second lens unit. FIGS. 1A to 7A are lens cross-sectional views in first to seventh exemplary embodiments of the present invention, respectively. In addition, FIGS. 1B to 7B are longitudinal aberration charts of photographic optical systems L0 according to the first to seventh exemplary embodiments, respectively. FIG. 10 is a schematic view illustrating main components of a single lens reflex camera system (image pickup apparatus) where a photographic optical system according to an exemplary embodiment of the present invention is attached to a camera body.

In each lens cross-sectional view, reference "L0" denotes a photographic optical system. Reference "SP" denotes an aperture stop. In FIGS. 1A, 2A, 3A, and 6A, reference "FP" denotes a flare-cut stop having a constant aperture diameter. Reference "L1" denotes a first lens unit having a positive refractive power; reference "L2" denotes a second lens unit; and reference "L3" denotes a third lens unit. The first lens unit L1 includes lens sub-units L1a and L1b having a positive refractive power which are separated by the widest air distance among distances within the first lens unit L1. The third lens unit L3 includes lens sub-units L31 to L33.

Reference "IP" denotes an image plane. The image plane IP corresponds to an imaging surface of a solid-state image sensor (photoelectric conversion element) receiving an image such as a CCD sensor or a CMOS sensor when a photographic optical system of a video camera or a digital camera is used. In addition, the image plane IP corresponds to a film surface when a photographic optical system of a silver-halide film camera is used. Reference "DOE" denotes a diffractive optical element.

Reference "D" denotes a diffractive optical portion (diffractive optical surface) of the diffractive optical element DOE. With respect to the diffracted light used for the exemplary embodiment among the diffracted light generated from the diffractive optical portion D, a diffraction order m thereof is 1, and a design wavelength $\lambda_0$ thereof is a wavelength (587.56 nm) of d-line. In addition, in each exemplary embodiment, the number of diffractive optical surfaces is not limited to one, but a plurality of diffractive optical surfaces may be added and used. As a result, it is possible to obtain much better optical performance. In addition, with respect to the diffractive optical surface, a base may be formed as an aspheric surface besides a spherical surface, and any material capable of transmitting light, for example, plastic as well as glass may be used as a material of the base.

Reference "NL" denotes an optical element made of solid material. In the aberration charts, reference numerals "d" and "g" denote d-line light and g-line light, respectively. Reference numerals "M" and "S" denote a meridional image plane and a sagittal image plane, respectively, and chromatic aberration of magnification is indicated by g-line. Reference "Fno" denotes an F-number, and reference "ω" denotes a half angle of view. All the aberration charts are plotted with a scale where spherical aberration is 0.2 mm, astigmatism is 0.2 mm, distortion is 2%, and chromatic aberration of magnification is 0.02 mm.

Features of the photographic optical system according to the exemplary embodiments of the present invention are described. In the related art, there is a demand for a large-aperture-ratio telephoto lens of which the total weight is light. In general, in a telephoto lens, a maximum value of a height from an optical axis, along which a paraxial on-axis ray passes through a lens surface, at a position closer to the object side than a point where the optical axis intersects the paraxial chief ray is larger than a maximum value of a height from an optical axis, along which a paraxial on-axis ray passes through a lens surface, at a position closer to an image side than the point where the optical axis intersects the paraxial chief ray.

Most telephoto lenses have a telephoto type lens configuration. In this case, there is a tendency for the F-number to be determined by an effective diameter of the most object-side lens (the lens nearest to the object plane). Therefore, in the telephoto lens, as a lens is closer to the object side than the most image-side lens (the lens nearest to the image plane), the effective diameter of the lens is increased. For this reason, as the F-number is decreased, in terms of a weight ratio with respect to the entire lens system, the object-side lens may easily become heavier than the image-side lens. To reduce the weight of the telephoto lens in this situation, if the object-side lens is formed by using a material having a low specific gravity, the effect of weight reduction can be increased.

Among various glass materials, GLASS (product name) manufactured by OHARA INC. may be exemplified as glass materials having a relatively low specific gravity, for example, in a range of about 2.5 to about 3.5 as follows. In a low dispersion range, there are S-BSL7 (product name) and S-FSL5 (product name). In a medium dispersion range, there are an S-NSL (product name) series material and an S-TIL (product name) series material. In addition, in a high dispersion range, there are an S-TIM (product name) series material, an S-TIH (product name) series material, and an S-NPH (product name) series material. On the contrary, as glass materials having a relatively high specific gravity in a range of about 3.5 to about 4.0 or more, there are a glass material having an anomalous partial dispersion property such as an S-FPL (product name) series material, an S-LAH (product name) series material, and the like. Materials having low refractive indexes and the same Abbe number have relatively low specific gravity from the low dispersion range to the medium dispersion range, and materials having higher dispersion and the same reflective index have relatively low specific gravity in the high dispersion range.

In general, a material used for an object-side lens of a telephoto lens is somewhat determined in terms of a Petzval sum and correction of chromatic aberration. As a material for a positive lens, there is, for example, the above-described S-FPL (product name) series material, fluorite, or the like having a low refractive index, low dispersion, and a high anomalous partial dispersion property. In addition, as a material for a negative lens, there is, for example, the above-described S-LAH (product name) series material or the like having a high reflective index, medium dispersion, and a small relative partial dispersion.

These glass materials correspond to the material having a relatively high specific gravity described above. Therefore, if these glass materials can be replaced with all materials having low specific gravity, it is possible to obtain great effect of weight reduction in the entire telephoto lens.

However, if a glass material such as S-FSL5 (product name) or S-BSL7 (product name) is used for the positive lens, the anomalous partial dispersion property is relatively small, and thus, chromatic aberration deteriorates particularly at the short wavelength range. In addition, if an S-TIH (product name) series material rather than an S-LAH (product name) series material is used for the negative lens, the relative partial dispersion is relatively large, and thus, in that case, chromatic aberration deteriorates particularly at the short wavelength range. In addition, although the S-LAH (product name) series material is replaced with the S-TIL (product name) series material while maintaining the Abbe number, since the refractive index is decreased by a large amount, Petzval sum deteriorates, and curvature of field deteriorates.

Therefore, in the photographic optical system according to the exemplary embodiments of the present invention, a diffractive optical element and an optical element made of solid material of which the anomalous partial dispersion property is relatively large are disposed closer to an object side than a point where an optical axis intersects a paraxial chief ray, and in this case, both elements are adapted to have a positive power. As understood by persons having ordinary skill in the art, the imaging characteristics of a lens may be described by two paraxial rays: the marginal ray and the paraxial chief ray. The marginal ray is directed from the axial object point with a paraxial angle in the object space chosen so that it passes through the edge of the aperture stop. The paraxial chief ray originates at the edge-of-field object point for the lens and is directed with such a paraxial chief ray angle in object space that the ray passes through the center of the aperture stop.

Accordingly, chromatic aberration, which deteriorates when the positive lens is replaced with a glass material such as S-FSL5 (product name) made of a material such as fluorite, is corrected by the diffractive optical element. In addition, chromatic aberration, which deteriorates when the glass material such as an S-LAH (product name) series material for the negative lens is replaced with a glass material such as an S-TIH (product name) series material, particularly, chromatic aberration between g-line and F-line is corrected by using an optical element made of solid material of which the anomalous partial dispersion property is relatively large. Therefore, the entire glass materials of the lenses constituting the first lens unit are occupied by the glass materials having a relatively low specific gravity.

In addition, in most photographic optical systems (optical systems), focusing is performed by moving the entire photographic optical system or some lens units of the photographic optical system. Among them, in the case of a large-aperture-ratio telephoto lens having a long focal length and a small F-number, the lens diameter becomes large, and the weight thereof is heavier than a telephoto lens having a large F-number. For this reason, it is difficult to perform focusing by moving the entire telephoto lens in terms of mechanism.

Therefore, in the photographic optical system according to the exemplary embodiments of the present invention, focusing is performed by moving the second lens unit having a lens diameter, which is smaller than that of the first lens unit, and a light weight along the optical axis, and a small-sized driving system having low torque may be used. In addition, in this arrangement, since an off-axis principal ray passes through a position in the vicinity of the center of the second lens unit (in the vicinity of the optical axis), it is possible to obtain the effect of suppressing a variation in aberration of the off-axis ray according to the object distance by performing focusing by moving the second lens unit. In addition, the photographic optical system according to the exemplary embodiments of the present invention includes a third lens unit closer to the image side than the second lens unit.

Therefore, a lens unit is disposed closer to the image side than the second lens unit, the height of the on-axis ray is low, and the lens surface where the off-axis principal ray passes through a high position can be disposed. Accordingly, it is possible to easily correct curvature of field or chromatic aberration of magnification. According to the lens configuration described hereinbefore, it is possible to achieve a high-image-quality photographic optical system having an overall light weight.

Next, characteristics of the photographic optical system according to each exemplary embodiment are described. At least one diffractive optical element and at least one optical element made of solid material are included closer to the object side than a position where a paraxial chief ray intersects an optical axis.

A focal length obtained by only a diffraction component of the diffractive optical element is denoted by fDOE. A focal length of the optical element made of solid material is denoted by fNL. A focal length of the first lens unit is denoted by f1, and a relative anomalous partial dispersion of a material forming the optical element NL made of solid material is denoted by $\Delta\theta gF_{NL}$.

In this case, the following conditions are satisfied.

$$10 < fDOE \times fNL/f1^2 < 600 \quad (1)$$

$$0.0272 < \Delta\theta gF_{NL} < 0.3000 \quad (2)$$

Herein, the relative anomalous partial dispersion $\Delta\theta gF_{NL}$ is defined by the following expressions if d-line, g-line, C-line, and F-line refractive indexes of the optical element made of solid material are denoted by $N_{dNL}$, $N_{gNL}$, $N_{CNL}$, and $N_{FNL}$, respectively.

$$\theta gF_{NL} = (N_{gNL} - N_{FNL})/(N_{FNL} - N_{CNL})$$

$$\theta gF_B = (-1.665 \times 10^{-7} \times vd^3 + 5.213 \times 10^{-5} \times vd^2 - 5.656 \times 10^{-3} \times vd + 0.7278)$$

$$\Delta\theta gF_{NL} = \theta gF_{NL} - \theta gF_B$$

Next, technical meaning of each condition described above will be described.

The condition (1) relates to power balance between the diffractive optical element DOE and the optical element NL made of solid material. If the upper limit value of the condition (1) is exceeded, both the power of the diffractive optical element DOE and the power of the optical element NL made of solid material are weakened, or any one of the powers is extremely weakened. In this case, chromatic aberration is insufficiently corrected, which is not desirable.

On the other hand, if the lower limit value of the condition (1) is exceeded, both of the power of the diffractive optical element DOE and the power of the optical element NL made of solid material are strengthened, or any one of the powers is extremely strengthened. In this case, chromatic aberration is over-corrected, and the balance between axial chromatic aberration and chromatic aberration of magnification is deteriorated, which is not desirable. More desirably, the numerical range of the condition (1) may be set as follows.

$$20 < fDOE \times fNL/f1^2 < 550 \quad (1a)$$

The condition (2) relates to a relative anomalous partial dispersion of a material of the optical element NL made of solid material.

If the upper limit value of the condition (2) is exceeded, the relative anomalous partial dispersion of the optical element NL made of solid material is too increased. In this case, chromatic aberration at a short wavelength side is over-corrected, which is not desirable. On the other hand, if the lower limit value of the condition (2) is exceeded, the relative anomalous partial dispersion of the optical element NL made of solid material is too decreased. In this case, chromatic aberration at a short wavelength side is insufficiently corrected, which is not desirable. More desirably, the numerical range of the condition (2) may be set as follows.

$$0.0272 < \Delta\theta gF_{NL} < 0.2500 \quad (2a)$$

In addition, more desirably, the numerical range of the condition (2a) may be set as follows.

$$0.0272 < \Delta\theta gF_{NL} < 0.2000 \quad (2b)$$

As a specific example of the solid material (hereinafter, referred to as an "optical material") satisfying the condition (2), there is a resin. Among various resins, particularly a UV curable resin (Nd=1.635, vd=22.7, θgF=0.69) and N-polyvinyl carbazole (Nd=1.696, vd=17.7, θgF=0.69) are the optical materials satisfying the condition (2). In addition, the present invention is not limited thereto, and any resin satisfying the condition (2) may be used.

In addition, as an optical material having characteristics different from those of a general glass material, there is a mixture obtained by dispersing inorganic oxide nano particles (inorganic particles) in a synthetic resin (transparent medium) as described later. In other words, there are $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), and the like. In addition, there are $BaTiO_3$ (Nd=2.4362, vd=11.3) and the like.

With respect to such an inorganic oxide material, in the case where $TiO_2$ (Nd=2.304, vd=13.8, θgF=0.87) particles are dispersed in a synthetic resin with an appropriate volume ratio, it is possible to obtain an optical material satisfying the condition (2). $TiO_2$ is a material utilized in various uses. In the field of optics, $TiO_2$ is used as a material for deposition constituting an optical thin film such as an anti-reflection film.

Besides, $TiO_2$ is used as a photocatalyst, a white pigment, and $TiO_2$ particles are used as a cosmetic material. In each exemplary embodiment, an average diameter of the $TiO_2$ particles dispersed in a resin is desirably in a range of about 2 nm to about 50 nm by taking into consideration of influence of scattering or the like, and a dispersing agent or like may be added to suppress aggregation.

As a medium material for dispersing $TiO_2$, a polymer may be used. It is possible to obtain high mass-productivity by performing shaping through photo-polymerization or thermal polymerization by using a shaping die. In addition, with respect to characteristics of optical constants of polymers, a polymer having a relatively large relative partial dispersion, a polymer having a relatively small Abbe number, or a polymer satisfying the two characteristics may be desirable, and N-polyvinyl carbazole, styrene, polymethylmethacrylate (arcryl), or the like may be employed. In the exemplary embodiments described later, a UV curable resin and N-polyvinyl carbazole are used as a host polymer for dispersing $TiO_2$ particles. However, the present invention is not limited thereto.

A dispersion property N(λ) of a mixture where nano particles are dispersed can be simply calculated by the following equation which is derived from the well-known Drude's Equation. In other words, the refractive index N(λ) at a wavelength λ is expressed as follows.

$$N(\lambda) = [1 + V\{N_{TiO}^2(\lambda) - 1\} + (1-V)\{N_P^2(\lambda) - 1\}]^{1/2} \quad (A)$$

Herein, $\lambda$ is an arbitrary wavelength, $N_{TiO}$ is a refractive index of $TiO_2$, $N_P$ is a refractive index of the polymer, and V is a fraction of a total volume of $TiO_2$ particles a volume of the polymer. According to the configuration described hereinbefore, the photographic optical systems according to the exemplary embodiments of the present invention can be achieved. It is more desirable that at least one of the conditions described below be satisfied. Accordingly, the effect of much lighter weight and high optical performance can be easily obtained.

A d-line refractive index and Abbe number of a material of a lens included in the first lens unit L1 other than the optical element NL made of solid material are denoted by $N_{d1}$ and $v_{d1}$, respectively. A d-line Abbe number of a material of a positive lens included in the first lens unit L1 other than the optical element NL made of solid material is denoted by $v_{d1P}$, and a d-line Abbe number of a material of a negative lens included in the first lens unit L1 is denoted by $v_{d1N}$. A d-line Abbe number of a material of the optical element made of solid material is denoted by $v_{dNL}$.

The first lens unit L1 includes a lens sub-unit L1a having a positive refractive power and a lens sub-unit L1b having a positive or negative refractive power which are separated by the widest air distance. An axial length from the most object-side lens surface of the entire system to an image plane is denoted by L.

The air distance between the lens sub-units L1a and L1b is indicated by d1ab. The focal length of the lens sub-unit L1a is indicated by f1a, and the focal length of the lens sub-unit L1b is indicated by f1b. The focal length of the entire system is indicated by f. When the object distance is infinite, the F-number of the entire system is indicated by Fno.

The focal length of the second lens unit L2 is indicated by f2, and the focal length of the third lens unit L3 is indicated by f3. The third lens unit L3 includes a lens sub-unit L31 having a positive refractive power, a lens sub-unit L32 having a negative refractive power, and a lens sub-unit L33 having a positive refractive power. The focal lengths of the lens sub-unit L31, the lens sub-unit L32, and the lens sub-unit L33 are indicated by f31, f32, and f33, respectively.

In this case, it is desirable that one or, more of the following conditions is satisfied.

$$8.986 \times 10^{-9} \times v_{d1}^4 - 5.469 \times 10^{-6} \times v_{d1}^3 + 8.088 \times 10^{-4} \times v_{d1}^2 - 4.553 \times 10^{-2} \times v_{d1} + 2.285 < N_{d1} < 3.384 \times 10^{-8} \times v_{d1}^4 - 1.348 \times 10^{-5} \times v_{d1}^3 + 1.761 \times 10^{-3} \times v_{d1}^2 - 9.477 \times 10^{-2} \times v_{d1} + 3.363 \quad (3)$$

$$30.0 < v_{d1P} < 75.0 \quad (4)$$

$$10.0 < v_{d1N} < 40.0 \quad (5)$$

$$5.0 < v_{dNL} < 60.0 \quad (6)$$

$$0.0500 < d1ab/(L \times Fno) < 0.2000 \quad (7)$$

$$-1.000 < f1a/f1b < 1.000 \quad (8)$$

$$5.0 < fDOE/f < 200.0 \quad (9)$$

$$1.0 < fDOE/fNL < 40.0 \quad (10)$$

$$0.460 < f/(f1a \times Fno) < 1.000 \quad (11)$$

$$0.0430 < \{(f1/f1a) \times d1ab\}/(f \times Fno) < 0.3000 \quad (12)$$

$$0.50 < |f1/f2| < 2.20 \quad (13)$$

$$0.10 < |f2/f3| < 1.00 \quad (14)$$

$$0.10 < |f2/f| < 2.00 \quad (15)$$

$$0.30 < |f3/f| < 10.00 \quad (16)$$

$$0.10 < f31/f < 3.00 \quad (17)$$

$$-0.50 < f32/f < -0.05 \quad (18)$$

$$0.05 < f33/f < 0.50 \quad (19)$$

Next, technical meaning of each condition described above will be described.

The condition (3) relates to a refractive index of an optical element material (lens material) included in the first lens unit L1 among the optical elements other than the optical element made of solid material. If the upper limit value of the condition (3) is exceeded, a material having a relatively high specific gravity is selected, so that it is difficult to reduce a weight of the entire system.

On the other hand, if the lower limit value of the condition (3) is exceeded, although the specific gravity is low, the refractive index is also decreased, so that the Petzval sum deteriorates. Therefore, it is difficult to correct curvature of field. The condition (4) relates to a d-line Abbe number of a material of a positive lens included in the first lens unit L1 among the optical elements other than the optical element NL made of solid material. If the upper limit value of the condition (4) is exceeded, a material having a relatively high specific gravity is selected, so that it is difficult to reduce a weight of the entire system. On the other hand, if the lower limit value of the condition (4) is exceeded, axial chromatic aberration is insufficiently corrected, which is not desirable. More desirably, the numerical range of the condition (4) may be set as follows.

$$40.0 < v_{d1P} < 75.0 \quad (4a)$$

The condition (5) relates to a d-line Abbe number of a material of a negative lens included in the first lens unit L1. If the upper limit value of the condition (5) is exceeded, a material having a relatively high specific gravity is selected, so that it is difficult to reduce a weight of the entire system. On the other hand, if the lower limit value of the condition (5) is exceeded, axial chromatic aberration is over-corrected, which is not desirable. More desirably, the numerical range of the condition (5) may be set as follows.

$$15.0 < v_{d1N} < 35.0 \quad (5a)$$

Figure 12:
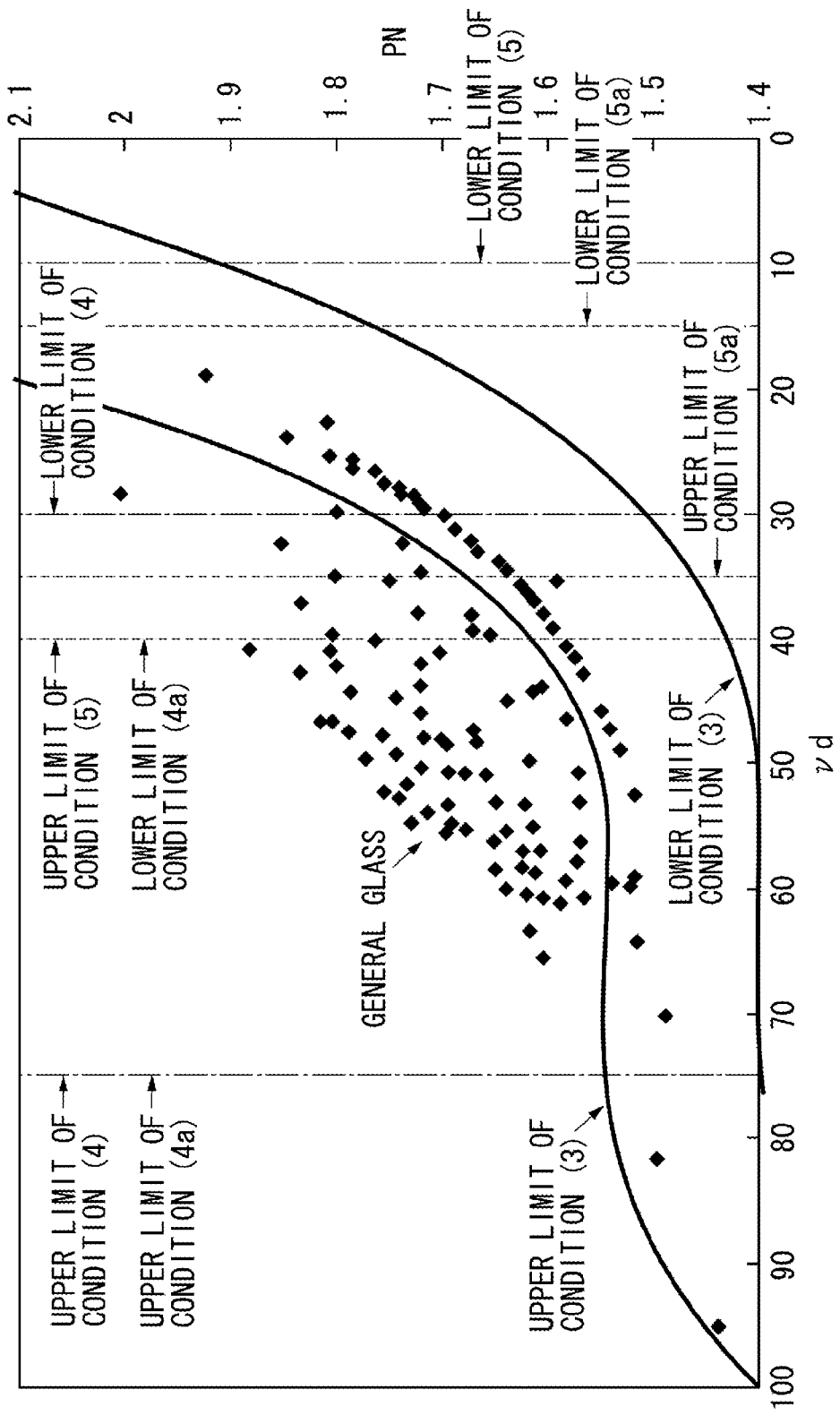
FIG. 12 is an explanatory diagram for describing ranges of conditions according to an exemplary embodiment of the present invention.

FIG. 12 is a diagram for describing ranges of the condition (3), (4), and (5). The condition (6) relates to a d-line Abbe number of a material of the optical element NL made of solid material. If the upper or lower limit value of the condition (6) is exceeded, it is difficult to take the balance between the correction of axial chromatic aberration and the correction of chromatic aberration of magnification as a whole optical system, which is not desirable. More desirably, the numerical range of the condition (6) may be set as follows.

$$10.0 < v_{dNL} < 50.0 \quad (6a)$$

In each exemplary embodiment, a largest air distance is disposed within the first lens unit L1, so that the first lens unit L1 is divided into the lens sub-unit L1a at the object side and the lens sub-unit L1b at the image side. In this case, desirably, the power of the lens sub-unit L1a is configured to be positive. By doing so, as the distance between the lens sub-units L1a and L1b is increased, the effective diameter of the lens of the lens sub-unit L1b can be reduced to allow the ray passing through the lens sub-unit L1a to converge, which is desirable.

In addition, as the power of the lens sub-unit L1a is strengthened, the effective diameter of the lens of the lens sub-unit L1b can be reduced to allow the ray passing through the lens sub-unit L1a to further converge, which is desirable. However, in general, with respect to a telephoto lens of the related art, of which the F-number is small in comparison with the focal length, spherical aberration or coma is increased in comparison with a telephoto lens of which the F-number is large. To correct this, the number of lens elements of the first lens unit L1 is increased up to a total of five or six, and the correction of aberration is performed.

However, if the distance between the lens sub-units L1a and L1b is simply increased from such a state, the total lens length is increased. Accordingly, since there is a need for a long lens barrel, the lens weight is increased due to the increase in the weight of the barrel portion in terms of overall weight.

Therefore, to widen the distance between the lens sub-units L1a and L1b while maintaining the total lens length, it is desirable that the number of lens elements be reduced. In addition, with respect to the deterioration of the aberration caused by the reduction in the number of lens elements, monochromatic aberration may be corrected by installing at least one aspheric surface within the first lens unit L1, and chromatic aberration may be corrected by setting the diffractive optical element and the optical element made of solid material to appropriate powers.

By doing so, the wide distance between the lens sub-units L1a and L1b can be secured, and the effective diameter of the lens in the lens sub-unit L1b can be decreased by strengthening the power of the lens sub-unit L1a. Accordingly, the weight is further reduced, which is desirable. Therefore, desirably, at least one of the conditions (7) to (10) is satisfied.

The condition (7) relates to the air distance between the lens sub-units L1a and L1b in the photographic optical system. If the upper limit value of the condition (7) is exceeded, the distance between the lens sub-units L1a and L1b is increased, a air space portion in first lens unit L1 is further enlarged. In addition, the lens sub-unit L1b is shifted (located) to the image-surface side, so that the effect of the weight reduction due to the decrease in the effective diameter of the lens sub-unit L1b can be obtained. However, accordingly, it is difficult to correct spherical aberration or coma occurring due to the lens sub-unit L1a by using the lens sub-unit L1b, so that spherical aberration and coma remain in the entire lens system.

On the other hand, if the lower limit value of the condition (7) is exceeded, the distance between the lens sub-units L1a and L1b is decreased, and the air space portion in the first lens unit L1 is reduced. In this case, since a plurality of lenses are included within the first lens unit L1, the effect of weight reduction cannot be obtained. More desirably, the numerical range of the condition (7) may be set as follows.

$$0.0700 < d1ab/(L \times Fno) < 0.2000 \tag{7a}$$

In addition, more desirably, the numerical range of the condition (7) may be set as follows.

$$0.0700 < d1ab/(L \times Fno) < 0.1500 \tag{7b}$$

The condition (8) relates to the powers of the lens sub-units L1a and L1b in the photographic optical system and reduction in an effective diameter of the lens sub-unit L1b. If the upper or lower limit value of the condition (8) is exceeded, the power of the lens sub-unit L1a is weakened in comparison with the lens sub-unit L1b. In this case, the effect of ray convergence due to the lens sub-unit L1a is weakened, so that the effective diameter of the lens of the lens sub-unit L1b is increased, which is not desirable. More desirably, the numerical range of the condition (8) may be set as follows.

$$-0.850 < f1a/f1b < 0.850 \tag{8a}$$

The condition (9) relates to the power of the diffractive optical element DOE in the first lens unit L1 of the photographic optical system. If the upper limit value of the condition (9) is exceeded, the power of the diffractive optical element DOE is weakened due to only the diffraction component thereof, it is difficult to effectively correct chromatic aberration occurring due to the first lens unit L1.

On the other hand, if the lower limit value of the condition (9) is exceeded, the power of the diffractive optical element DOE is too strengthened due to the only the diffraction component thereof. Accordingly, there is a need for a fine pitch of the diffraction grating. If the pitch of the diffraction grating is fine, it is difficult to produce the diffraction grating, which is not desirable. In addition, if the power of the diffractive optical element DOE is too strengthened beyond the lower limit value, it is difficult to maintain the balance between axial chromatic aberration and chromatic aberration of magnification which are in a trade-off relation, which is not desirable. More desirably, the numerical range of the condition (9) may be set as follows.

$$7.0 < fDOE/f < 150.0 \tag{9a}$$

In addition, more desirably, the numerical range of the condition (9a) may be set as follows.

$$7.0 < fDOE/f < 100.0 \tag{9b}$$

The condition (10) relates to power balance between the diffractive optical element DOE and the optical element NL made of solid material. If the upper or lower limit value of the condition (10) is exceeded, the balance between the power of the diffractive optical element DOE and the power of the optical element NL made of solid material is lost, so that it is difficult to effectively correct chromatic aberration occurring due to the first lens unit L1. More desirably, the numerical range of the condition (10) may be set as follows.

$$1.0 < fDOE/fNL < 30.0 \tag{10a}$$

The condition (11) relates to the power of the lens sub-unit L1a of the photographic optical system. If the upper limit value of the condition (11) is exceeded, the power of the lens sub-unit L1a is too strengthened, so that the effect of weight reduction of the first lens unit L1 is increased. However, it is difficult to correct spherical aberration or coma occurring due to the lens sub-unit L1a by using the lens sub-unit L1b and the following units.

On the other hand, if the lower limit value of the condition (11) is exceeded, the power of the lens sub-unit L1a is too weakened, so that the effective diameter of the lens in the lens sub-unit L1b is increased. Therefore, it is difficult to reduce the weight of the lens in the first lens unit L1. More desirably, the numerical range of the condition (11) may be set as follows.

$$0.470 < f/(f1a \times Fno) < 1.000 \tag{11a}$$

In addition, more desirably, the numerical range of the condition (11a) may be set as follows.

$$0.470 < f/(f1a \times Fno) < 0.700 \tag{11b}$$

The condition (12) relates to a balance between the power of the lens sub-unit L1a and the air distance between the lens sub-units L1a and L1b in the photographic optical system. If the upper limit value of the condition (12) is exceeded, the power of the lens sub-unit L1a is strengthened, or the distance between the lens sub-units L1a and L1b is increased. Therefore, the effect of reducing the weight of the first lens unit L1 is increased. However, it is difficult to correct spherical aberration or coma occurring due to the lens sub-unit L1a by using the lens sub-unit L1b and the following units.

On the other hand, if the lower limit value of the condition (12) is exceeded, the power of the lens sub-unit L1a is weakened, or the distance between the lens sub-units L1a and L1b is decreased. Therefore, the effective diameter of the lens in the lens sub-unit L1b is increased, and the air space portion in the first lens unit L1 is decreased. In that case, it is difficult to reduce the lens weight in the first lens unit L1. More desirably, the numerical range of the condition (12) may be set as follows.

$$0.0450 < \{(f1/f1a) \times d1ab\}/(f \times Fno) < 0.3000 \tag{12a}$$

In addition, more desirably, the numerical range of the condition (12a) may be set as follows.

$$0.0450 < \{(f1/f1a) \times d1ab\}/(f \times Fno) < 0.2000 \tag{12b}$$

The condition (13) relates to a balance of the powers of the first lens unit L1 and the second lens unit L2 in the photographic optical system, and particularly, to a reduction in the effective diameter of the second lens unit L2.

If the upper limit value of the condition (13) is exceeded, the power of the first lens unit L1 is weakened in comparison with the second lens unit L2, so that the effect of the ray convergence due to the first lens unit L1 is weakened. For this reason, the effective diameter of the lens of the second lens unit L2 is increased, which is not desirable.

On the other hand, if the lower limit value of the condition (13) is exceeded, the power of the first lens unit L1 is strengthened in comparison with the second lens unit L2, and the effect of the lens weight reduction is increased due to the decrease in the effective diameter of the lens of the second lens unit L2. However, spherical aberration, coma, and chromatic aberration occurring due to the first lens unit L1 is not entirely corrected but partially exists in the first lens unit L1, so that it is difficult to correct aberrations by using the second lens unit L2 and the following units. More desirably, the numerical range of the condition (13) may be set as follows.

$$0.50 < |f1/f2| < 2.00 \tag{13a}$$

In addition, more desirably, the numerical range of the condition (13a) may be set as follows.

$$0.70 < |f1/f2| < 2.00 \tag{13b}$$

The condition (14) relates to a balance of the powers of the second lens unit L2 and the third lens unit L3 in the photographic optical system. If the upper limit value of the condition (14) is exceeded, the power of the third lens unit L3 is strengthened in comparison with the second lens unit L2. If the power of the third lens unit L3 is too strengthened, curvature of field is increased, so that it is difficult to perform the correction. On the other hand, if the lower limit value of the condition (14) is exceeded, the power of the second lens unit L2 is strengthened in comparison with the third lens unit L3. If the power of the second lens unit L2 is too strengthened, spherical aberration is increased, so that it is difficult to perform the correction. More desirably, the numerical range of the condition (14) may be set as follows.

$$0.20 < |f2/f3| < 1.00 \tag{14a}$$

In addition, more desirably, the numerical range of the condition (14a) may be set as follows.

$$0.20 < |f2/f3| < 0.75 \tag{14b}$$

The condition (15) relates to the power of the second lens unit L2 of the photographic optical system. If the upper limit value of the condition (15) is exceeded, the power of the second lens unit L2 is weakened. In this case, the amount of movement of the second lens unit L2 during focusing is increased, so that the size of the lens system becomes large. On the other hand, if the lower limit value of the condition (15) is exceeded, the amount of movement of the second lens unit L2 during focusing is decreased. However, much spherical aberration occurs due to the second lens unit L2, so that it is difficult to perform the correction with a good balance by using the first lens unit L1 or the third lens unit L3. More desirably, the numerical range of the condition (15) may be set as follows.

$$0.20 < |f2/f| < 2.00 \tag{15a}$$

In addition, more desirably, the numerical range of the condition (15a) may be set as follows.

$$0.20 < |f2/f| < 1.50 \tag{15b}$$

The condition (16) relates to the power of the third lens unit L3 of the photographic optical system. If the upper limit value of the condition (16) is exceeded, the power of the third lens unit L3 is weakened. In this case, adjustment of a back focus distance needs to be performed by using the refractive power of the first lens unit L1 or the second lens unit L2. As a result, since a degree of freedom in the correction of the aberration of the first lens unit L1 or the second lens unit L2 becomes small, spherical aberration, coma, or the like remains. On the other hand, if the lower limit value of the condition (16) is exceeded, the power of the third lens unit L3 is strengthened. Therefore, an occurrence amount of a curvature of field, distortion, or the like is increased, so that it is difficult to correct curvature of field, the distortion, or the like, which is not desirable. More desirably, the numerical range of the condition (16) may be set as follows.

$$0.50 < |f3/f| < 10.00 \tag{16a}$$

In addition, more desirably, the numerical range of the condition (16a) may be set as follows.

$$0.50 < |f3/f| < 5.00 \tag{16b}$$

Furthermore, the lens sub-unit L1a of the first lens unit L1 includes one positive lens or two lenses. In addition, the lens sub-unit L1b includes one positive lens and one negative lens. According to the lens configuration, the number of lens elements is decreased, and the wide distance between the lens sub-units L1a and L1b can be easily maintained, so that the total weight of the first lens unit L1 can be reduced easily. In addition, an aperture stop SP is disposed between the second lens unit L2 and the third lens unit L3.

The position where the off-axis principal ray intersects the optical axis exists between the second lens unit L2 and the third lens unit L3 which are located in the vicinity of the center of lens. For this reason, it is desirable that the aperture stop be disposed between the second lens unit L2 and the third lens unit L3. Therefore, even in the case where the aperture stop is reduced, a proper near-image-plane light amount can be maintained easily. In addition, desirably, the diffractive surface (the diffractive optical surface) D of the diffractive optical element DOE installed on the optical path is formed on a cemented lens surface to improve dustproof, assembly workability, and mechanical strength. In addition, a composite refractive power of the first lens unit L1 and the second lens unit L2 is configured to be positive.

In addition, the convergent ray passing through the second lens unit L2 is allowed to further converge by the lens sub-unit L31 having a positive refractive power, so that the effective diameter of the lens of the lens sub-unit L32 (image shift correcting unit) can be reduced easily. Furthermore, the lens sub-unit L33 having a positive refractive power is disposed, so that it is possible to increase the refractive power of the lens sub-unit L32 having a negative refractive power while maintaining a constant focal length of the entire lens system. Therefore, it is possible to easily obtain a large shift of image position on an image-forming surface (hereinafter, a relation between an amount of eccentricity and a shift of image position being referred to as an image shift sensitivity) by using small eccentric movement of the lens sub-unit L32.

According to the conditions (17) to (19), the powers of the partial lens units in the third lens unit L3 are set appropriately. Therefore, when the shifting of the image-forming position is performed by moving the lens sub-unit L32 in the direction substantially perpendicular to the optical axis, it is possible to secure good imaging performance while obtaining a large image shift sensitivity. If it deviates from the numerical range of the conditions (17) to (19), it is difficult to maintain the balance. More desirably, the numerical ranges of the conditions (17) to (19) may be set as follows.

$$0.12 < f31/f < 2.50 \quad (17a)$$

$$-0.40 < f32/f < -0.05 \quad (18a)$$

$$0.07 < f33/f < 0.40 \quad (19a)$$

As described hereinbefore, according to the exemplary embodiments, chromatic aberration over the entire image plane is corrected, and a photographic optical system having a high optical performance can be obtained.

Next, features of the lens configurations of the exemplary embodiments will be described. Reference numerals allocated to the lenses correspond to the reference numerals allocated to the aforementioned lenses. First, common configurations of the exemplary embodiments will be described. A photographic optical system according to each exemplary embodiment includes a first lens unit L1 having a positive power, a second lens unit L2 having a positive or negative power, and a third lens unit L3 having a positive or negative power in order from a position closest to an object side. In addition, an aperture stop SP is disposed between the second lens unit L2 and the third lens unit L3. In addition, the third lens unit L3 includes a lens sub-unit L31 having a positive power, a lens sub-unit L32 having a negative power, and a lens sub-unit L33 having a positive power. In addition, when the photographic optical system is vibrated, shake correction (vibration correction) of a photographed image is performed by moving the lens sub-unit L32 as a movable lens unit (image shift correcting unit) to have a component in the direction perpendicular to the optical axis as indicated by arrow LT.

Next, a detailed configuration of the exemplary embodiments will be described. Herein, a UV curable resin 1, an N-polyvinyl carbazole, or a TiO₂ particle-dispersed material, where $TiO_2$ is dispersed in a UV curable resin as a host polymer, are used as an optical material satisfying the conditions (2) and (6). In addition, two types of UV curable resin (UV curable resin 1 and UV curable resin 2) are used as a UV curable resin for dispersing $TiO_2$ particles.

Figure 11:
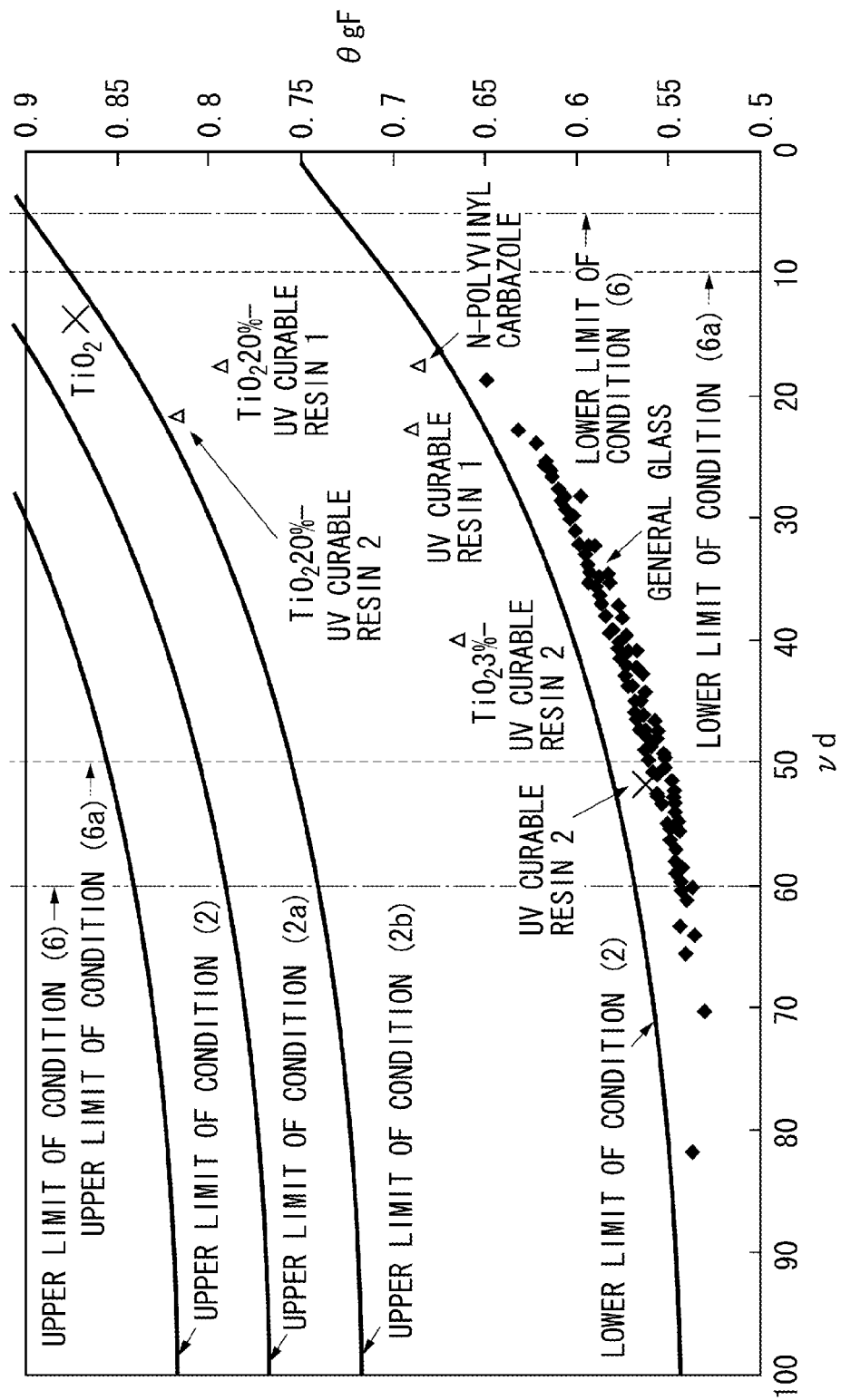
FIG. 11 is an explanatory diagram for describing ranges of conditions according to an exemplary embodiment of the present invention.

Optical constant values of optical materials (UV curable resin 1, $TiO_2$ particle-dispersed material, and N-polyvinyl carbazole) described below used in the first to seventh exemplary embodiments are listed in Table-1, and individual optical constant values of a UV curable resin 2 and $TiO_2$ constituting a $TiO_2$ particle-dispersed material are listed in Table-2. Each table lists refractive indexes and Abbe numbers of each optical material with respect to d-line, g-line, C-line, and F-line, and a value of relative partial dispersion thereof. FIG. 11 illustrates relations between the optical materials and the conditions (2) and (6).

Figure 1A:
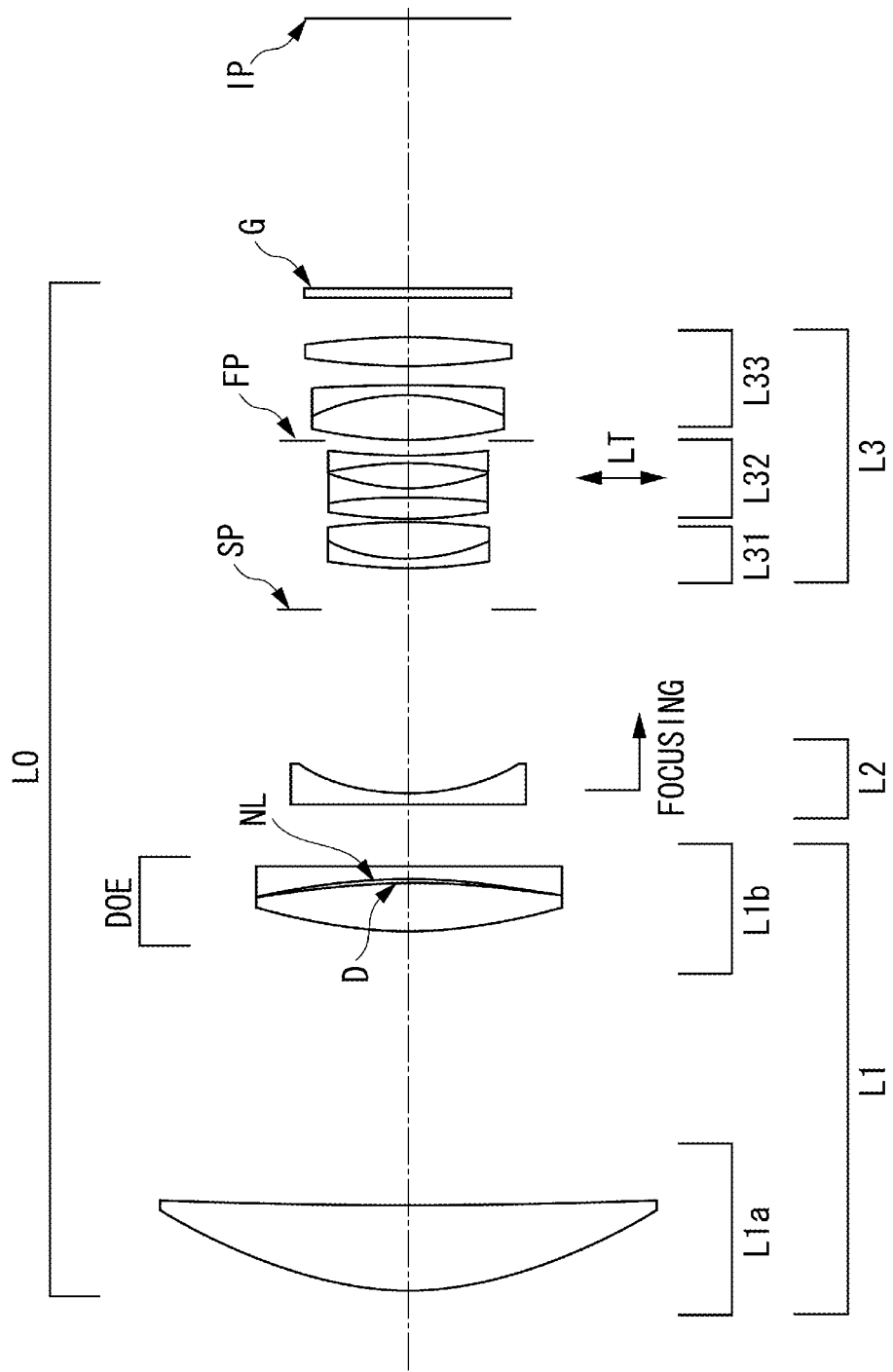
FIGS. 1A and 1B are a lens cross-sectional view and an aberration chart of a photographic optical system at an infinitely-distant object distance according to a first exemplary embodiment of the present invention.
Figure 1B:
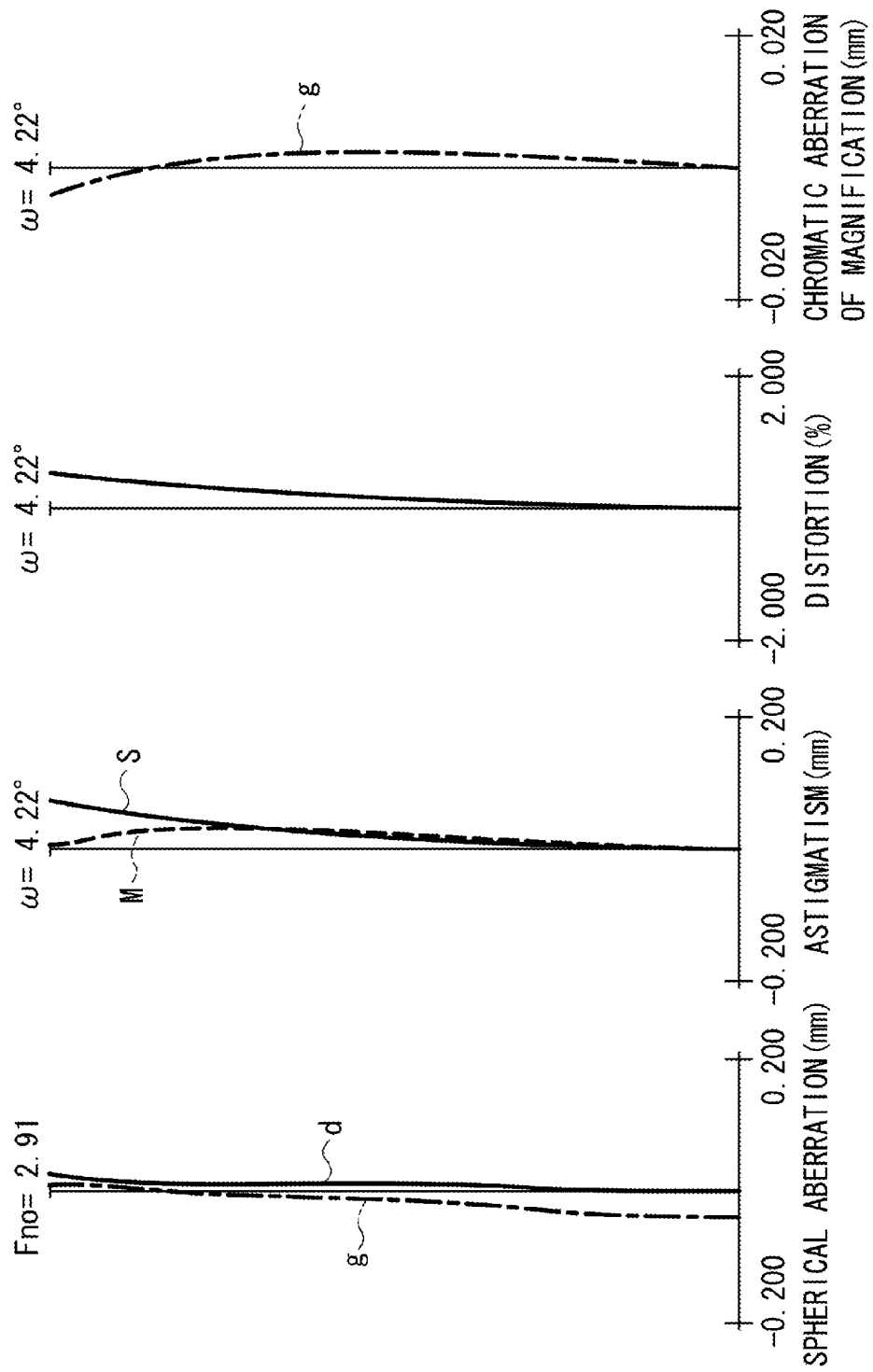

A photographic optical system L0 according to the first exemplary embodiment illustrated in FIG. 1A includes first to third lens units L1 to L3. The first lens unit L1 includes a lens sub-unit L1a including one positive lens and a lens sub-unit L1b including a cemented lens (diffractive optical element DOE) obtained by cementing three members of one positive lens, an optical element NL made of solid material, and one negative lens.

In this case, the optical element NL made of solid material is adapted by using a lens (optical element having a power (refractive power)) made of a UV curable resin 1 (Table-1). The optical element NL (layer) made of the UV curable resin 1 has a positive refractive power. The diffractive optical portion D constituting the diffractive optical element DOE is formed on a cemented surface of the positive lens and the optical element NL made of solid material in the lens sub-unit L1b. The most object-side lens surface of the lens sub-unit L1a and the most object-side lens surface of the lens sub-unit L1b are aspheric. In addition, the second lens unit L2 includes one negative lens.

The third lens unit L3 includes lens sub-units L31 to L33. The lens sub-unit L31 includes a cemented lens obtained by cementing one negative lens and one positive lens. The lens sub-unit L32 includes a cemented lens obtained by cementing one positive lens and one negative lens and one negative lens. The position of a photographed image is shifted by moving the lens sub-unit L32 to have a component in a direction perpendicular to an optical axis. The lens sub-unit L33 includes a cemented lens obtained by cementing one positive lens and one negative lens and one positive lens.

Focusing on a near-distance object from an infinitely-distant object is performed by moving the second lens unit L2 to an axial image plane side.

Figure 2A:
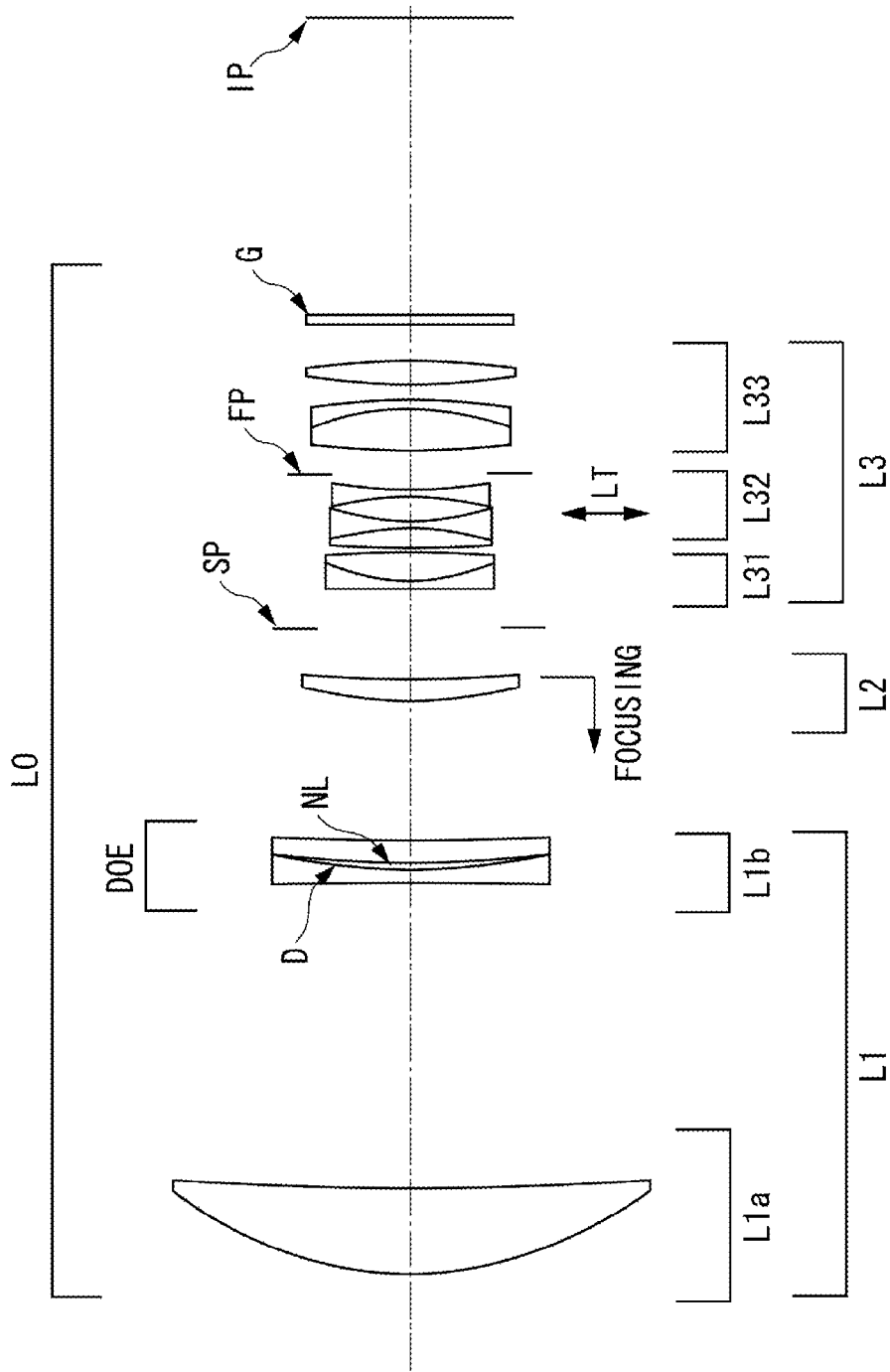
FIGS. 2A and 2B are a lens cross-sectional view and an aberration chart of a photographic optical system at an infinitely-distant object distance according to a second exemplary embodiment of the present invention.
Figure 2B:
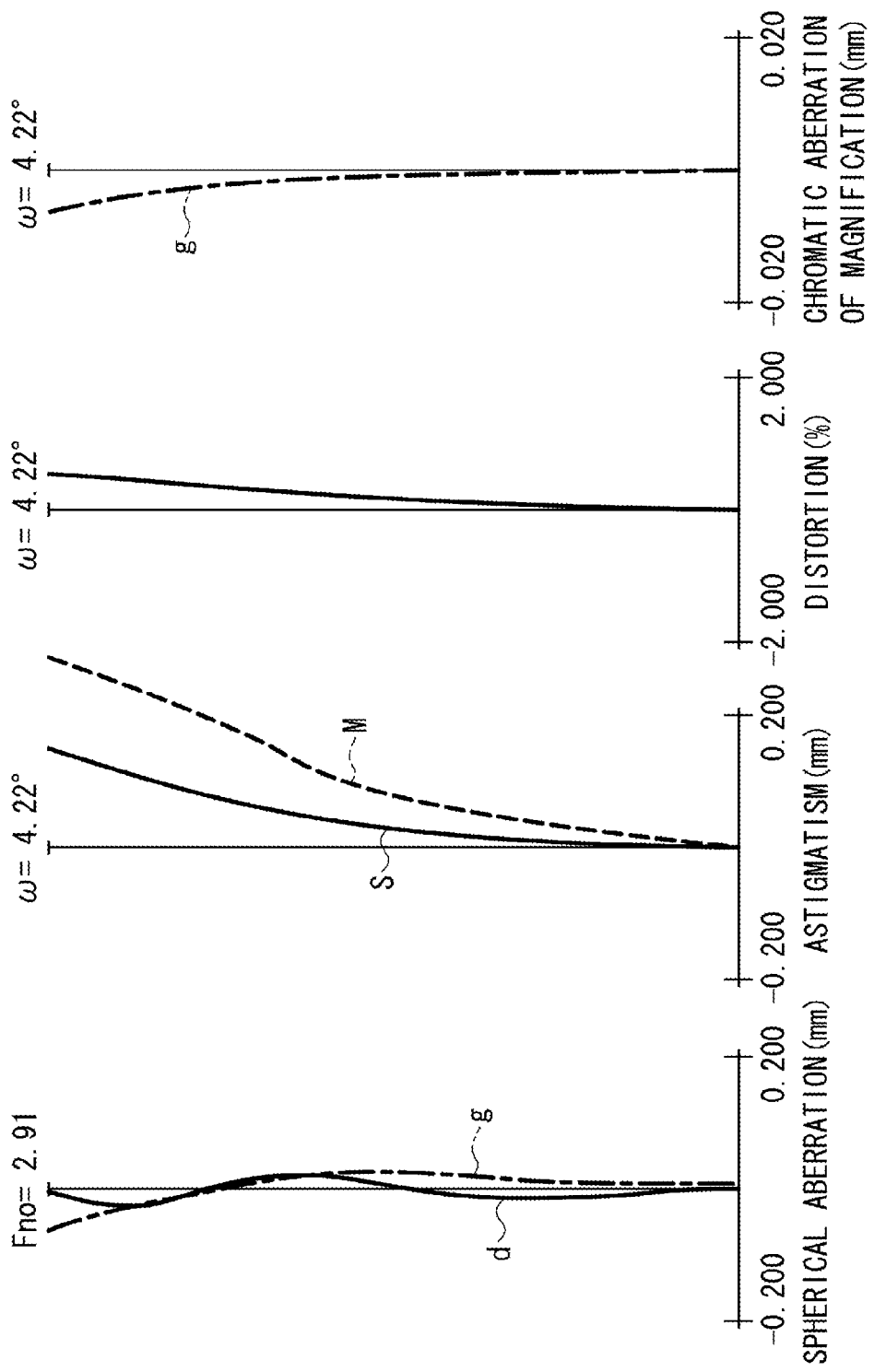
Figure 4A:
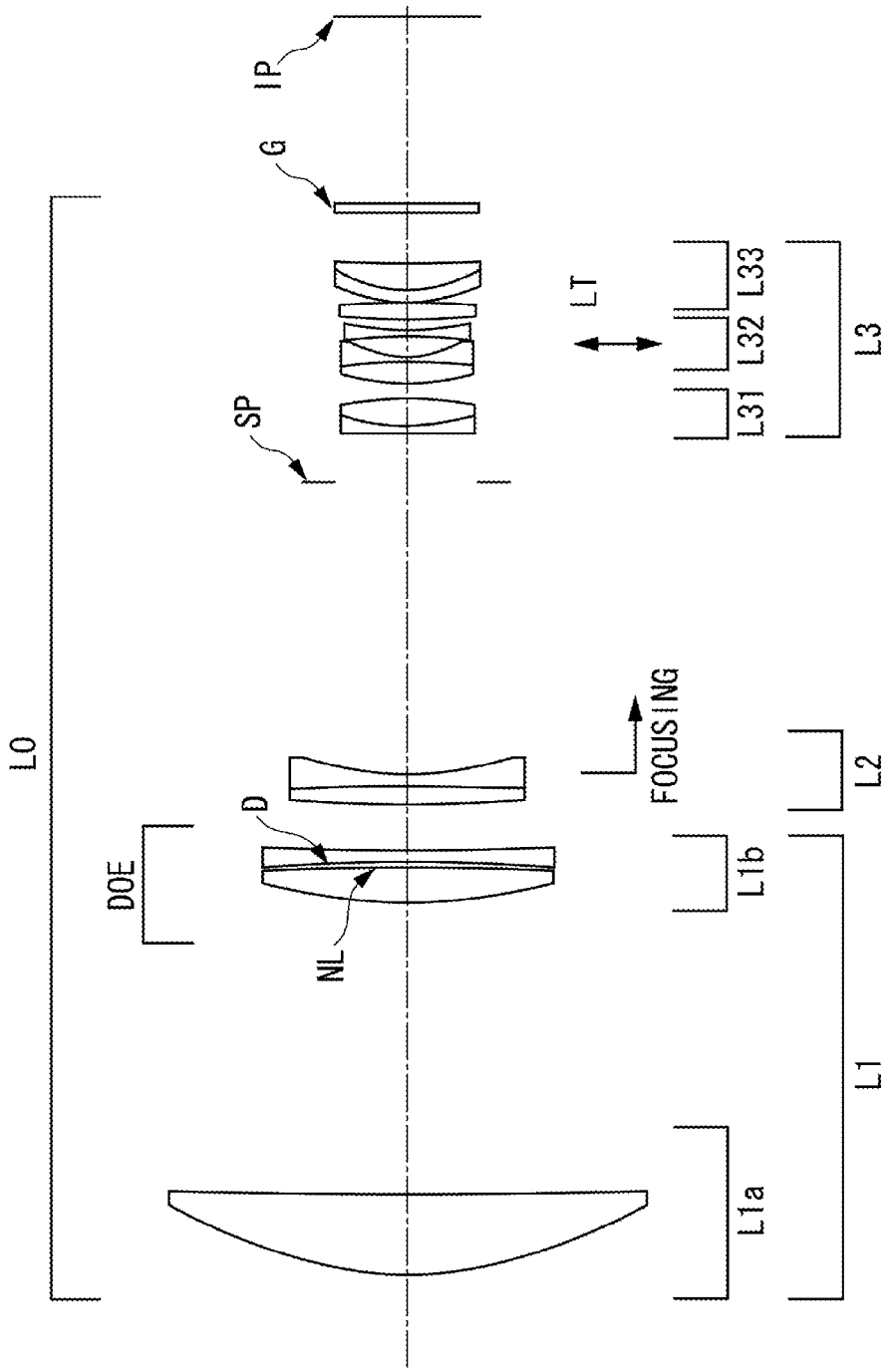
FIGS. 4A and 4B are a lens cross-sectional view and an aberration chart of a photographic optical system at an infinitely-distant object distance according to a fourth exemplary embodiment of the present invention.
Figure 4B:
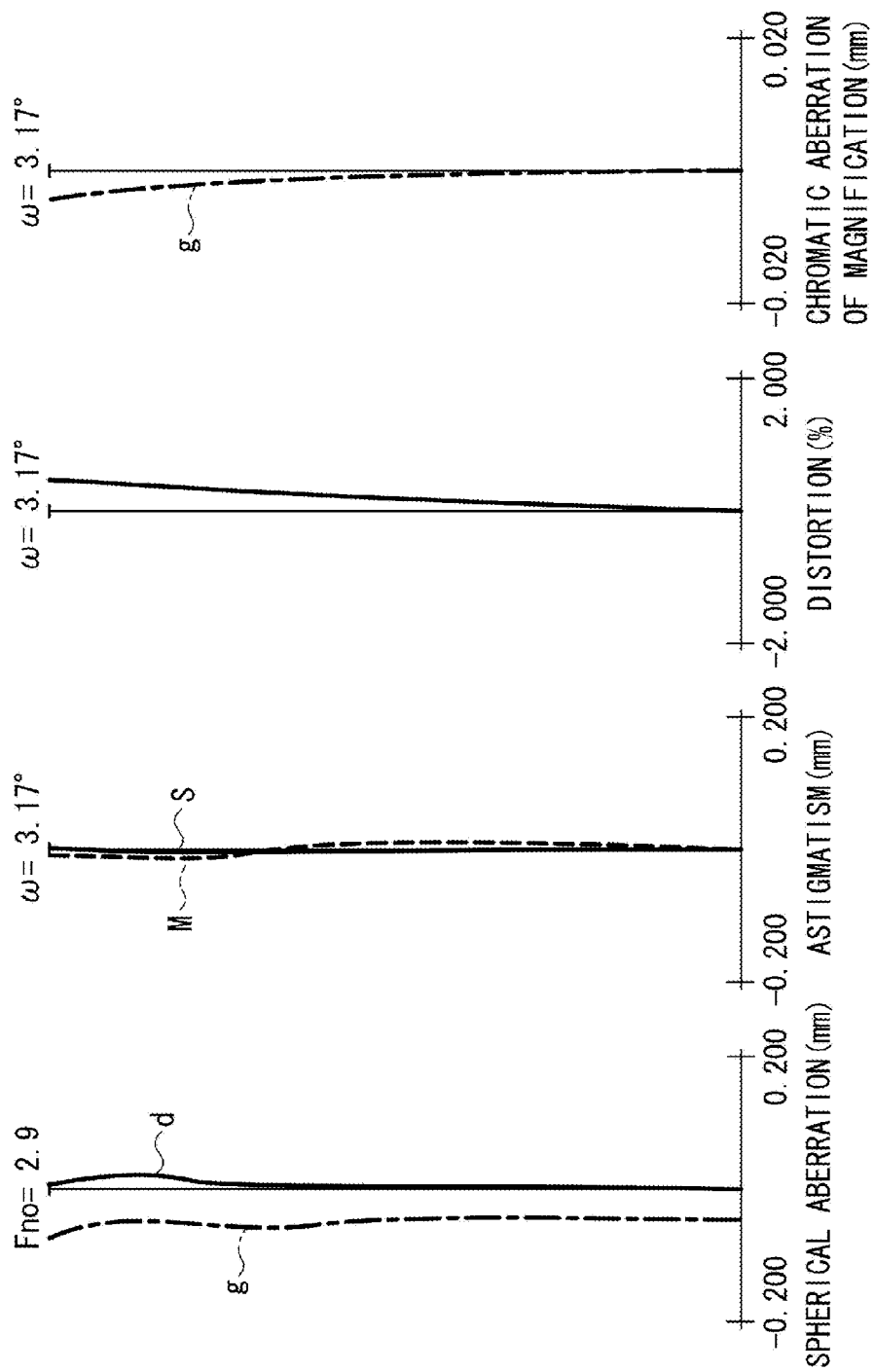

A photographic optical system L0 according to the second exemplary embodiment illustrated in FIG. 2A includes first to third lens units L1 to L3. The first lens unit L1 includes a lens sub-unit L1a including one positive lens and a lens sub-unit L1b including a cemented lens (diffractive optical element) obtained by cementing three members of one negative lens, an optical element NL made of solid material, and one positive lens. In this case, the optical element NL made of solid material is adapted by using a lens (optical element having a power) made of a UV curable resin 1 (Table-1). The optical element NL (layer) made of the UV curable resin 1 has a positive refractive power.

The diffractive optical portion D constituting the diffractive optical element DOE is formed on a cemented surface of the optical element NL made of solid material and the positive lens in the lens sub-unit L1b. The most object-side lens surface of the lens sub-unit L1a and the most object-side lens surface of the lens sub-unit L1b are aspheric. In addition, the second lens unit L2 includes one positive lens. In addition, the most object-side lens surface of the second lens unit L2 has an aspheric shape. The third lens unit L3 includes lens sub-units L31 to L33. The lens sub-unit L31 includes a cemented lens obtained by cementing one negative lens and one positive lens.

The lens sub-unit L32 includes a cemented lens obtained by cementing one positive lens and one negative lens and one negative lens. The position of a photographed image is shifted by moving the lens sub-unit L32 to have a component in a direction perpendicular to an optical axis. The lens sub-unit L33 includes a cemented lens obtained by cementing one positive lens and one negative lens and one positive lens. In addition, the object-side lens surface of the positive lens at the image side of the lens sub-unit L33 has an aspheric shape. Focusing on a near-distance object from an infinitely-distant object is performed by moving the second lens unit L2 to an axial object side.

A photographic optical system L0 according to the third exemplary embodiment illustrated in FIG. 3A includes first to third lens units L1 to L3. The first lens unit L1 includes a lens sub-unit L1a including one positive lens and a lens sub-unit L1b including a cemented lens (diffractive optical element) obtained by cementing three members of one positive lens, an optical element NL made of solid material, and one negative lens.

In this case, the optical element NL made of solid material is adapted by using a lens (optical element having a power) made of a mixture (Table-1) obtained by dispersing $TiO_2$ particles in a UV curable resin 1 with a volume ratio of 20%. The lens (layer) made of a $TiO_2$ particle-dispersed material has a positive refractive power. The diffractive optical portion D constituting the diffractive optical element DOE is formed on a cemented surface of the optical element NL made of solid material and the negative lens in the lens sub-unit L1b. The most object-side lens surface of the lens sub-unit L1a and the most object-side lens surface of the lens sub-unit L1b are aspheric.

In addition, the second lens unit L2 includes a cemented lens obtained by cementing one positive lens and one negative lens. The third lens unit L3 includes lens sub-units L31 to L33. The lens sub-unit L31 includes a cemented lens obtained by cementing one negative lens and one positive lens. The lens sub-unit L32 includes one negative lens and a cemented lens obtained by cementing one positive lens and one negative lens. The position of a photographed image is shifted by moving the lens sub-unit L32 to have a component in a direction perpendicular to an optical axis.

The lens sub-unit L33 includes a cemented lens obtained by cementing one positive lens and one negative lens and one positive lens. Focusing on a near-distance object from an infinitely-distant object is performed by moving the second lens unit L2 to an axial image plane side. A photographic optical system L0 according to the fourth exemplary embodiment illustrated in FIG. 4A includes first to third lens units L1 to L3. The first lens unit L1 includes a lens sub-unit L1a including one positive lens and a lens sub-unit L1b including a cemented lens (diffractive optical element) obtained by cementing three members of one positive lens, an optical element NL made of solid material, and one negative lens.

In this case, the optical element NL made of solid material is adapted by using a lens (optical element having a power) made of a mixture (Table-1) obtained by dispersing $TiO_2$ particles in a UV curable resin 2 with a volume ratio of 20%. The lens (layer) made of a $TiO_2$ particle-dispersed material has a positive refractive power. The diffractive optical portion D constituting the diffractive optical element DOE is formed on a cemented surface of the optical element NL made of solid material and the negative lens in the lens sub-unit L1b. The most object-side lens surface of the lens sub-unit L1a and the most object-side lens surface of the lens sub-unit L1b are aspheric.

In addition, the second lens unit L2 includes a cemented lens obtained by cementing one positive lens and one negative lens. In addition, the most image-side lens surface of the second lens unit L2 has an aspheric shape. The third lens unit L3 includes lens sub-units L31 to L33. The lens sub-unit L31 includes a cemented lens obtained by cementing one negative lens and one positive lens. The lens sub-unit L32 includes a cemented lens obtained by cementing one positive lens and one negative lens and one negative lens. The position of a photographed image is shifted by moving the lens sub-unit L32 to have a component in a direction perpendicular to an optical axis.

In addition, the lens sub-unit L33 includes one positive lens and a cemented lens obtained by cementing one negative lens and one positive lens. Focusing on a near-distance object from an infinitely-distant object is performed by moving the second lens unit L2 to an axial image plane side.

Figure 5A:
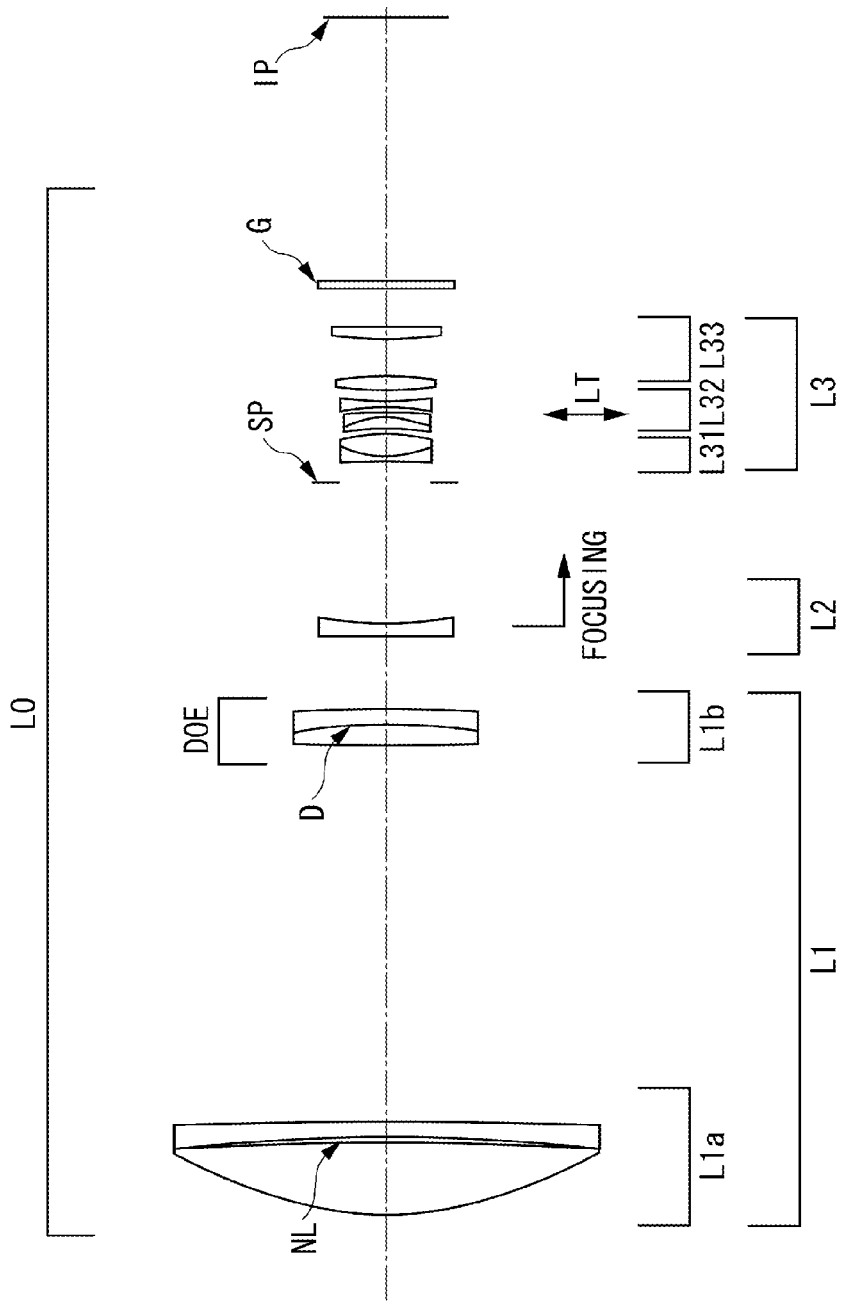
FIGS. 5A and 5B are a lens cross-sectional view and an aberration chart of a photographic optical system at an infinitely-distant object distance according to a fifth exemplary embodiment of the present invention.
Figure 5B:
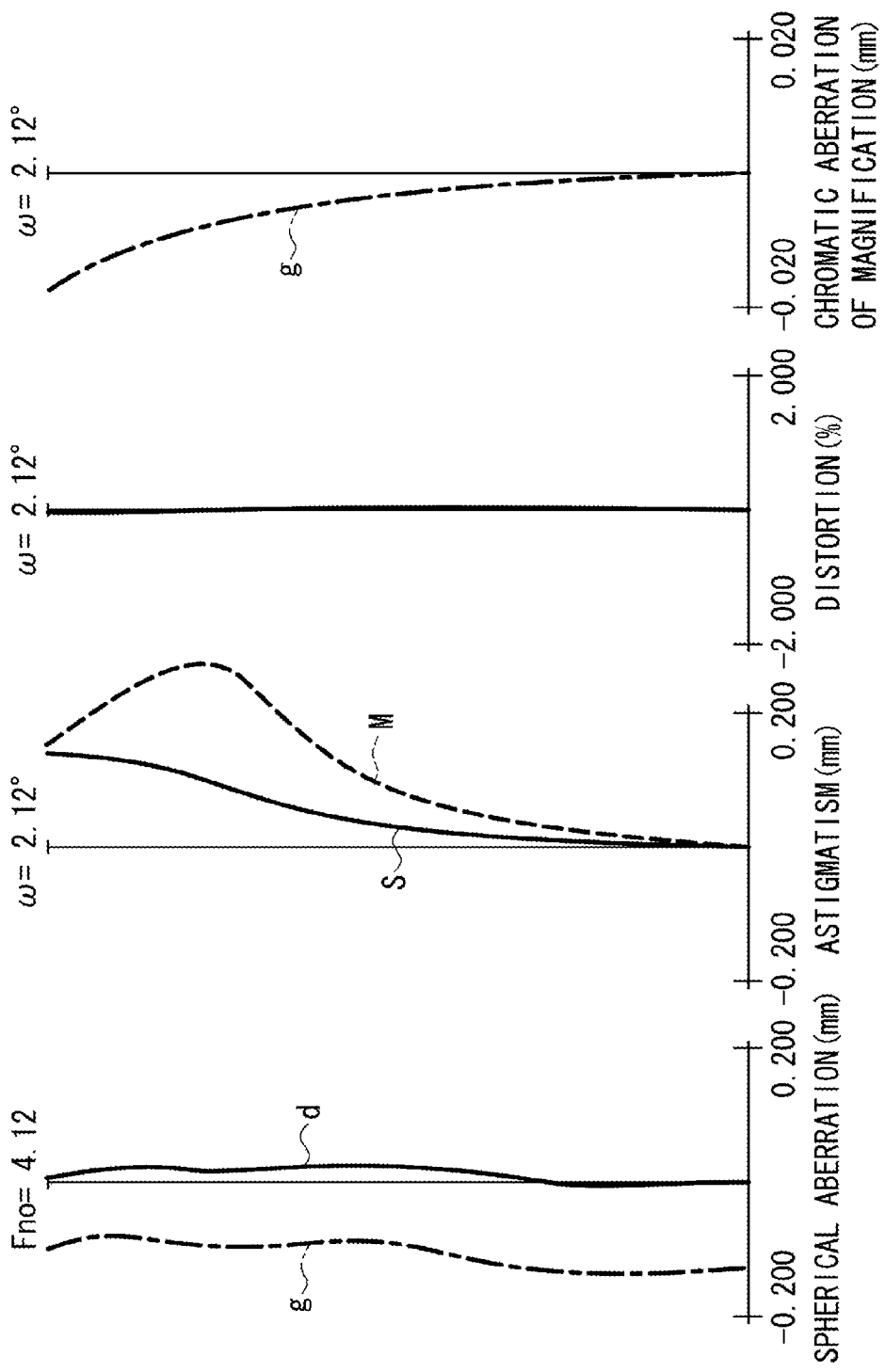
Figure 6A:
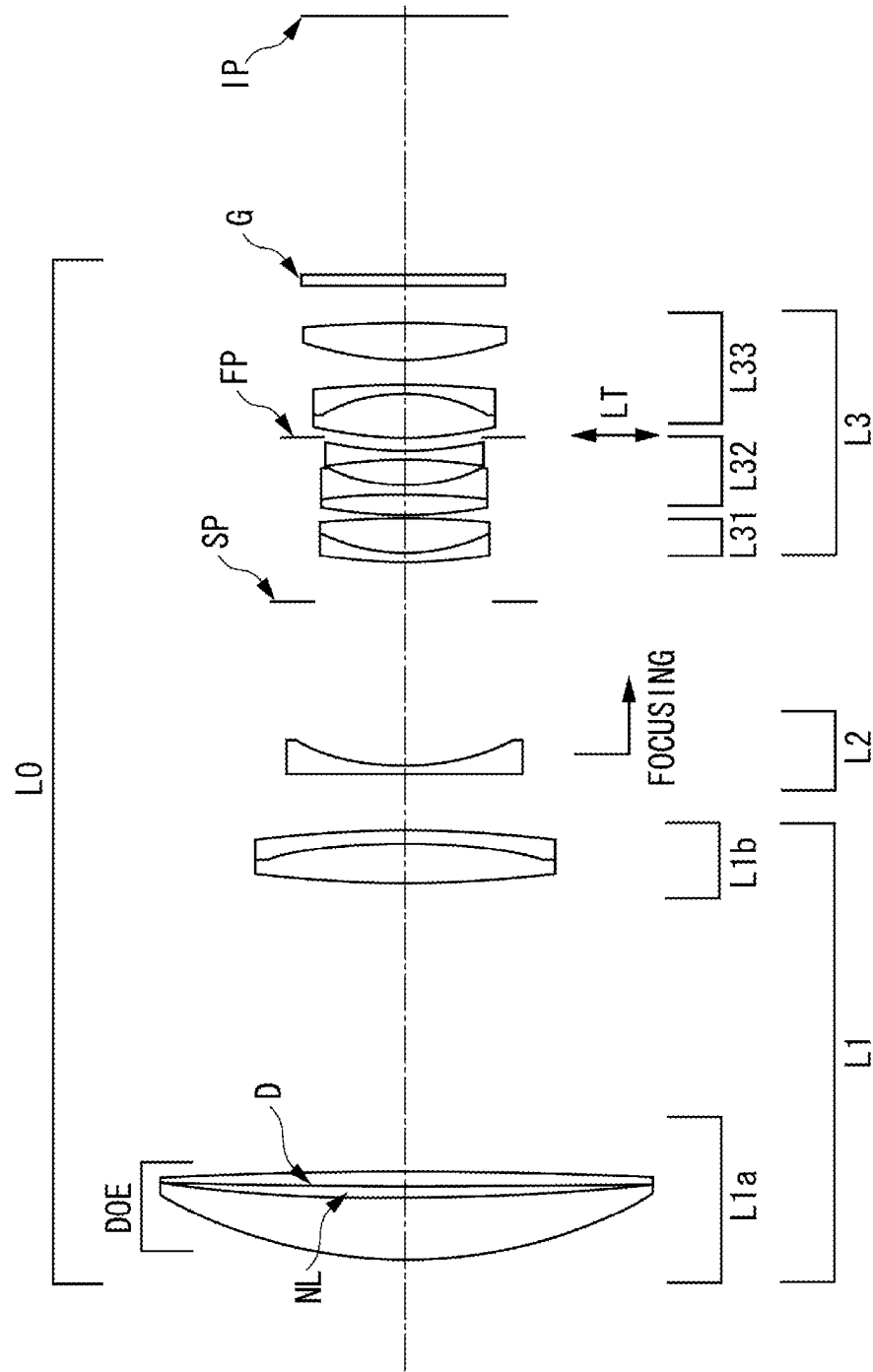
FIGS. 6A and 6B are a lens cross-sectional view and an aberration chart of a photographic optical system at an infinitely-distant object distance according to a sixth exemplary embodiment of the present invention.
Figure 6B:
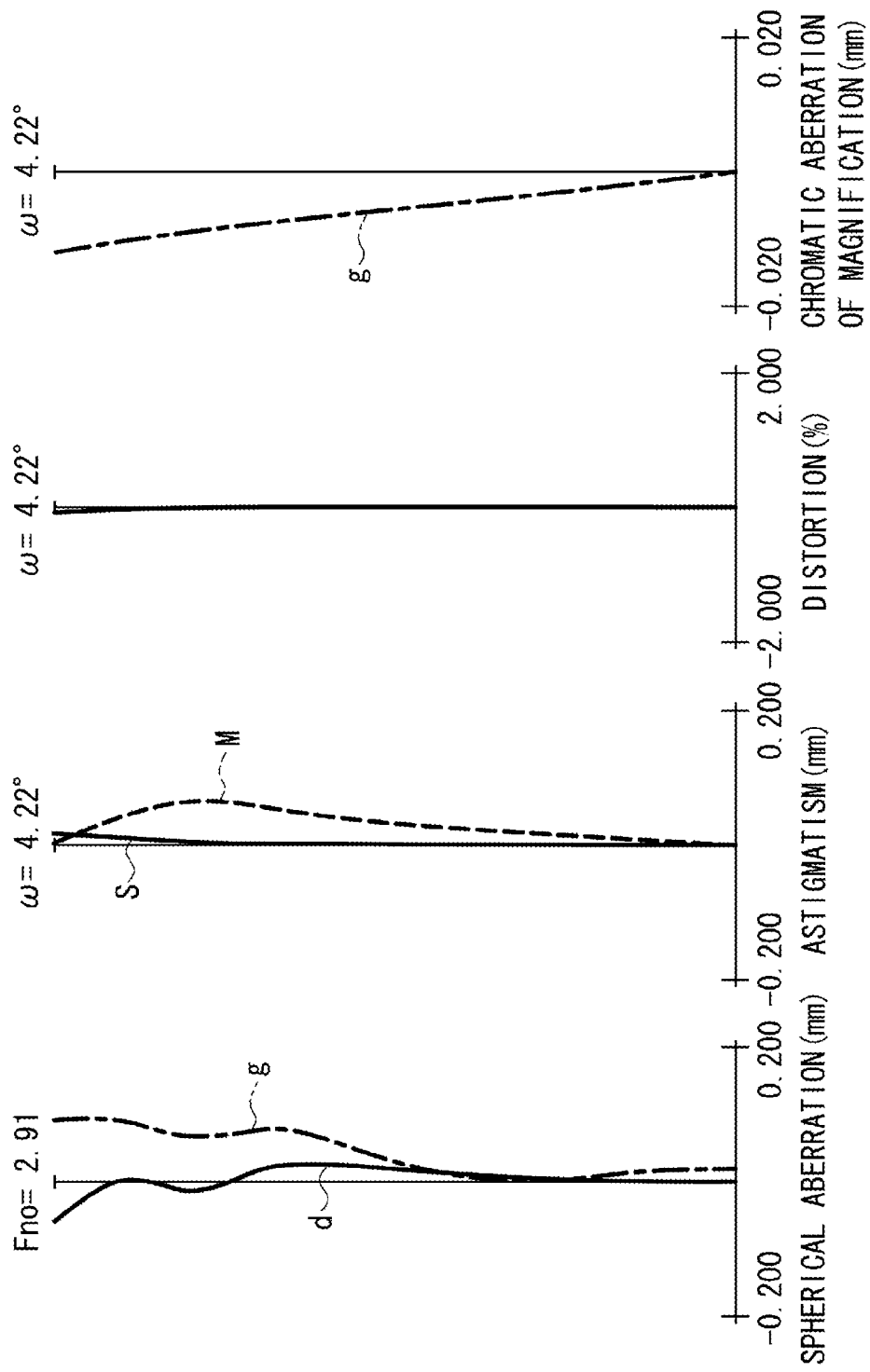

A photographic optical system L0 according to the fifth exemplary embodiment illustrated in FIG. 5A includes first to third lens units L1 to L3. The first lens unit L1 includes lens sub-units L1a and L1b. The lens sub-unit L1a includes a cemented lens obtained by cementing three members of one positive lens, an optical element NL made of solid material, and one negative lens. The lens sub-unit L1b includes a cemented lens (diffractive optical element) obtained by cementing one positive lens and one negative lens.

In this case, the optical element NL made of solid material is adapted by using a lens (optical element having a power) made of a UV curable resin 1 (Table-1). The lens (layer) made of the UV curable resin 1 has a positive refractive power. The diffractive optical portion D constituting the diffractive optical element DOE is formed on a cemented lens surface of the lens sub-unit L1b. The most object-side lens surface of the lens sub-unit L1a and the most object-side lens surface of the lens sub-unit L1b are aspheric. In addition, the second lens unit L2 includes one negative lens.

The third lens unit L3 includes lens sub-units L31 to L32. The lens sub-unit L31 includes a cemented lens obtained by cementing one negative lens and one positive lens. The lens sub-unit L32 includes a cemented lens obtained by cementing one positive lens and one negative lens and one negative lens. The position of a photographed image is shifted by moving the lens sub-unit L32 to have a component in a direction perpendicular to an optical axis. In addition, the lens sub-unit L33 includes two positive lenses.

Focusing on a near-distance object from an infinitely-distant object is performed by moving the second lens unit L2 to an axial image plane side. A photographic optical system L0 according to the sixth exemplary embodiment illustrated in FIG. 6A includes first to third lens units L1 to L3. The first lens unit L1 includes lens sub-units L1a and L1b. The lens sub-unit L1a includes a cemented lens (diffractive optical element) obtained by cementing three members of one positive lens, an optical element NL made of solid material, and one positive lens. In addition, the lens sub-unit L1b includes a cemented lens obtained by cementing one positive lens and one negative lens.

In this case, the optical element NL made of solid material is adapted by using a lens (optical element having a power) made of N-polyvinyl carbazole (Table-1). The lens (layer) made of N-polyvinyl carbazole has a positive refractive power. The diffractive optical portion D constituting the diffractive optical element DOE is formed on a cemented lens surface of the optical element NL made of solid material of the lens sub-unit L1a and the positive lens of the image side. The most object-side lens surface of the lens sub-unit L1a and the most object-side lens surface of the lens sub-unit L1b are aspheric.

In addition, the second lens unit L2 includes one negative lens. The third lens unit L3 includes lens sub-units L31 to L33. The lens sub-unit L31 includes a cemented lens obtained by cementing one negative lens and one positive lens. The lens sub-unit L32 includes a cemented lens obtained by cementing one positive lens and one negative lens and one negative lens. The position of a photographed image is shifted by moving the lens sub-unit L32 to have a component in a direction perpendicular to an optical axis.

The lens sub-unit L33 includes a cemented lens obtained by cementing one positive lens and one negative lens and one positive lens. Focusing on a near-distance object from an infinitely-distant object is performed by moving the second lens unit L2 to an axial image plane side.

Figure 7A:
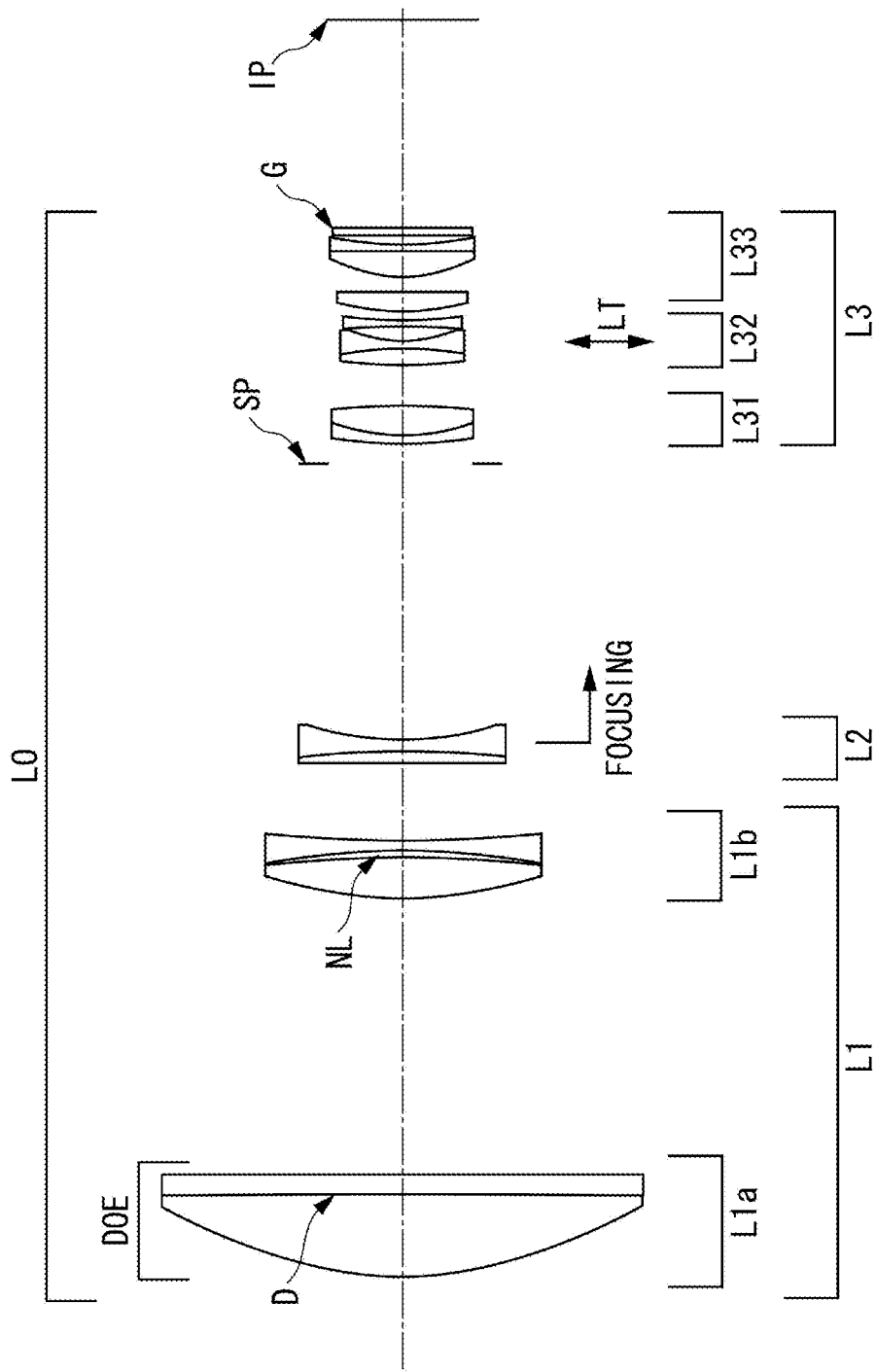
FIGS. 7A and 7B are a lens cross-sectional view and an aberration chart of a photographic optical system at an infinitely-distant object distance according to a seventh exemplary embodiment of the present invention.
Figure 7B:
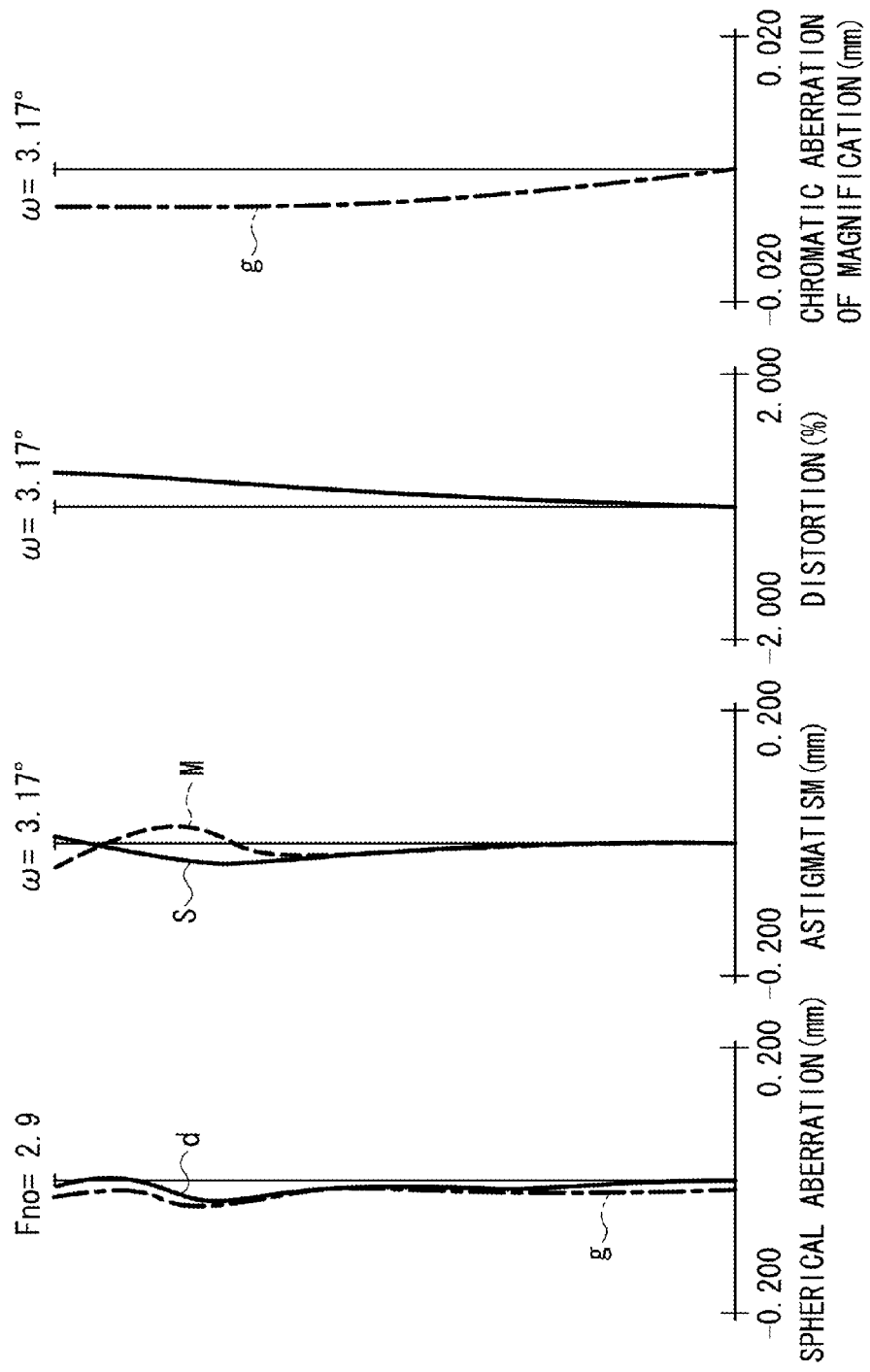

A photographic optical system L0 according to the seventh exemplary embodiment illustrated in FIG. 7A includes first to third lens units L1 to L3. The first lens unit L1 includes lens sub-units L1a and L1b. The lens sub-unit L1a includes a cemented lens (diffractive optical element) obtained by cementing one positive lens and one negative lens. The lens sub-unit L1b includes a cemented lens obtained by cementing three members of one positive lens, an optical element NL made of solid material, and one negative lens.

In this case, the optical element NL made of solid material is adapted by using a lens (optical element having a power) made of a mixture (Table-1) obtained by dispersing $TiO_2$ particles in a UV curable resin 2 with a volume ratio of 3%. The lens (layer) made of a $TiO_2$ particle-dispersed material has a positive refractive power. The diffractive optical portion D constituting the diffractive optical element DOE is formed on a cemented lens surface of the lens sub-unit L1a. The most object-side lens surface of the lens sub-unit L1a and the most object-side lens surface of the lens sub-unit L1b are aspheric.

In addition, the second lens unit L2 includes a cemented lens obtained by cementing one positive lens and one negative lens. The third lens unit L3 includes lens sub-units L31 to L33. The lens sub-unit L31 includes a cemented lens obtained by cementing one negative lens and one positive lens. In addition, the lens sub-unit L32 includes a cemented lens obtained by cementing one positive lens and one negative lens and one negative lens. The position of a photographed image is shifted by moving the lens sub-unit L32 to have a component in a direction perpendicular to an optical axis.

The lens sub-unit L33 includes one positive lens and a cemented lens obtained by cementing one positive lens and one negative lens. Focusing on a near-distance object from an infinitely-distant object is performed by moving the second lens unit L2 to an axial image plane side. Herein, a configuration of a diffractive optical element DOE used in a photographic optical system L0 according to the exemplary embodiments will be described. The diffractive optical portion D constituting the diffractive optical element DOE disposed in the photographic optical system is adapted by using a diffraction grating which has a rotational symmetry with respect to an optical axis.

Figure 8A:
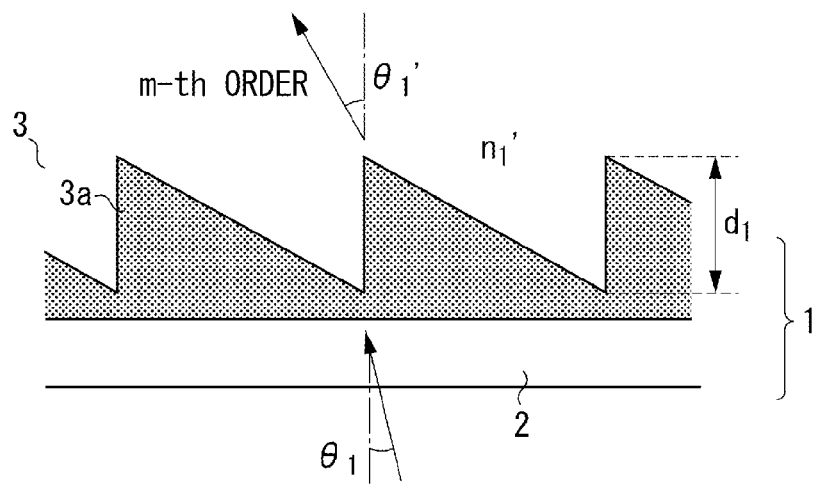
FIGS. 8A and 8B are explanatory diagrams for describing a diffractive optical element according to an exemplary embodiment of the present invention.
Figure 8B:
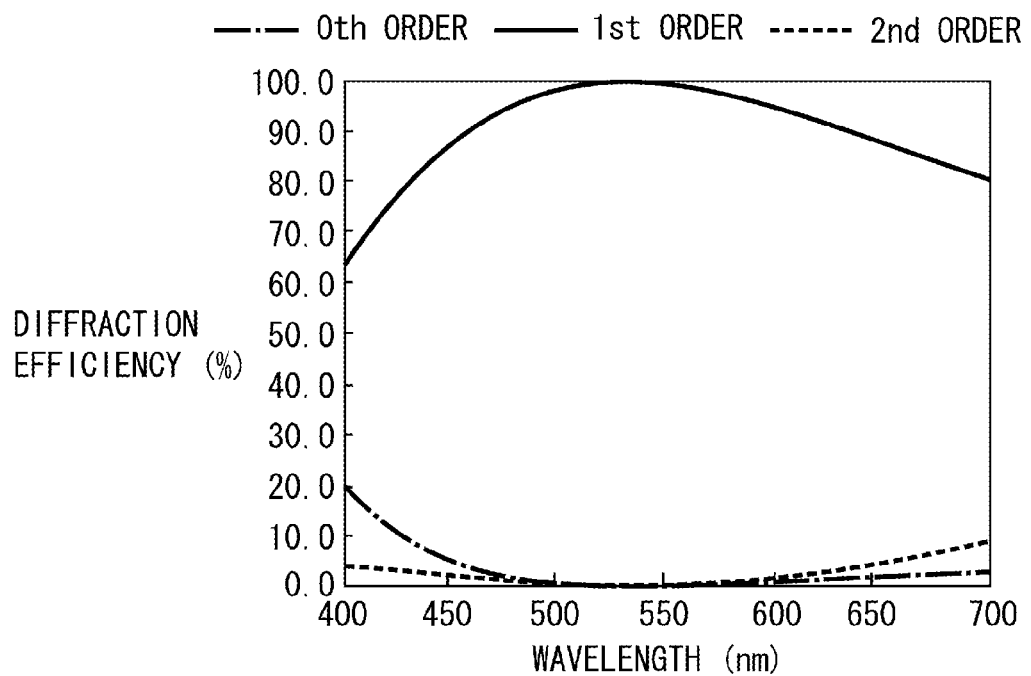

FIG. 8A is an enlarged partial cross-sectional view of a portion of a diffractive optical portion constituting the diffractive optical element 1. The diffractive optical element 1 illustrated in FIG. 8A is adapted by installing a diffraction grating (diffractive optical portion) 3, which is formed as one layer, on a substrate (transparent substrate) 2. Furthermore, the substrate 2 may also be a lens. FIG. 8B is a diagram illustrating characteristics of a diffraction efficiency of the diffractive optical element 1. In FIG. 8B, the horizontal axis represents a wavelength, and the vertical axis represents diffraction efficiency. In addition, the diffraction efficiency is a ratio of a light amount of diffracted light to a total transmitting light flux. Herein, reflected light or the like at a boundary surface of a grating portion 3a is not taken into consideration to avoid the description from being complicated.

A UV curable resin (refractive index $n_d$=1.513, Abbe number $v_d$=51.0) is used as an optical material of the diffraction grating 3. The grating thickness $d_1$ of the grating portion 3a is set to 1.03 μm, and factors are set so that the +1st-order diffracted light having a wavelength of 530 nm has the highest diffraction efficiency. In other words, with respect to the diffractive optical element 1 according to the exemplary embodiment, the design order is +1st order, and the design wavelength is 530 nm. In FIG. 8B, the diffraction efficiency of the +1st-order diffracted light is indicated by a solid line.

In addition, in FIG. 8B, the diffraction efficiencies at the diffraction orders (0th order and +2nd order as (+1±1)-th orders) around the design order are additionally plotted. As understood from FIG. 8B, the diffraction efficiency at the design order has the highest value around the design wavelength and is gradually decreased as it goes away from the wavelength. The light corresponding to the decrease in the diffraction efficiency at the design order becomes diffracted light (unwanted light) at the other orders, which cause flare. In addition, in the case where the diffractive optical elements are used at plural sites in the optical system, the decrease in the diffraction efficiency at wavelengths rather than the design wavelength is also associated with the decrease in transmittance.

Figure 9A:
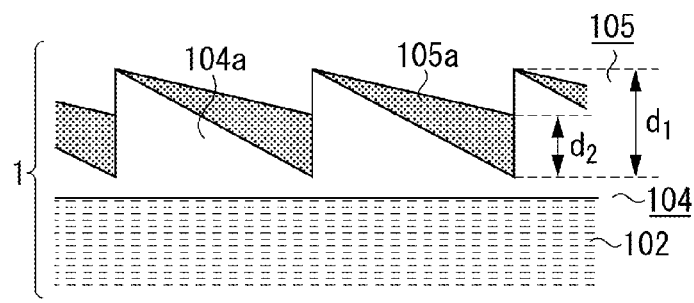
FIGS. 9A, 9B, and 9C are explanatory, diagrams for describing a diffractive optical element according to an exemplary embodiment of the present invention.

Next, a laminated type diffractive optical element where a plurality of diffraction gratings which are formed by using different materials are laminated on a substrate will be described. FIG. 9A is a partial enlarged cross-sectional view of a laminated type diffractive optical element 1, and FIG. 9B is a diagram illustrating wavelength dependency of a diffraction efficiency of a +1st-order diffracted light of a diffractive optical element 1 illustrated in FIG. 9A.

In the diffractive optical element 1 illustrated in FIG. 9A, a first diffraction grating 104, which is formed by using a UV curable resin (refractive index $n_d$=1.499, Abbe number $v_d$=54), is formed on a substrate 102. In addition, a second diffraction grating 105 (refractive index $n_d$=1.598, Abbe number $v_d$=28) is formed thereon. In the combination of these materials, a grating thickness $d_1$ of a grating portion 104a of the first diffraction grating 104 is $d_1$=13.8 μm, and a grating thickness $d_2$ of a grating portion 105a of the second diffraction grating 105 is $d_2$=10.5 μm.

Figure 9B:
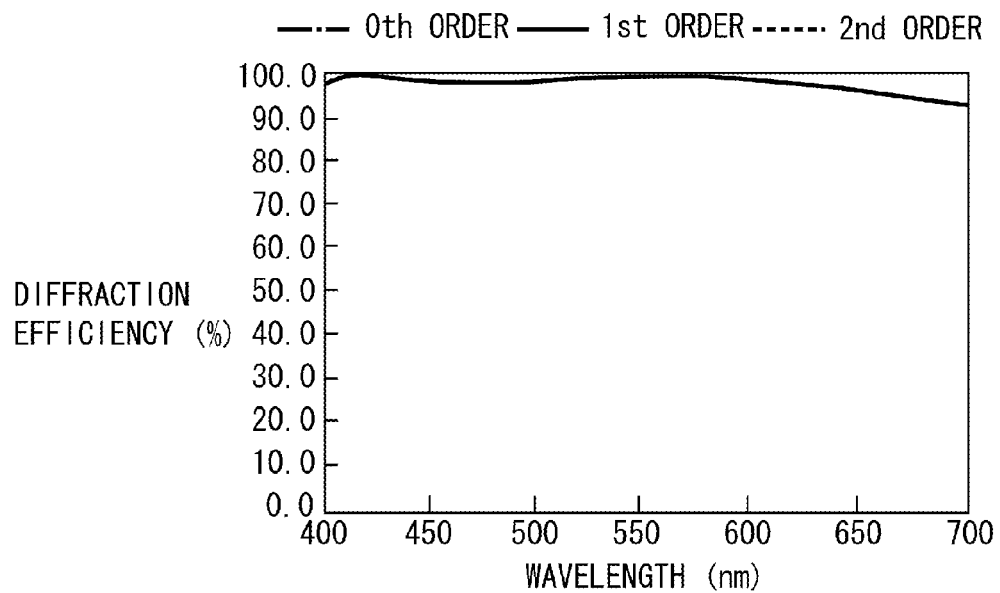
Figure 9C:
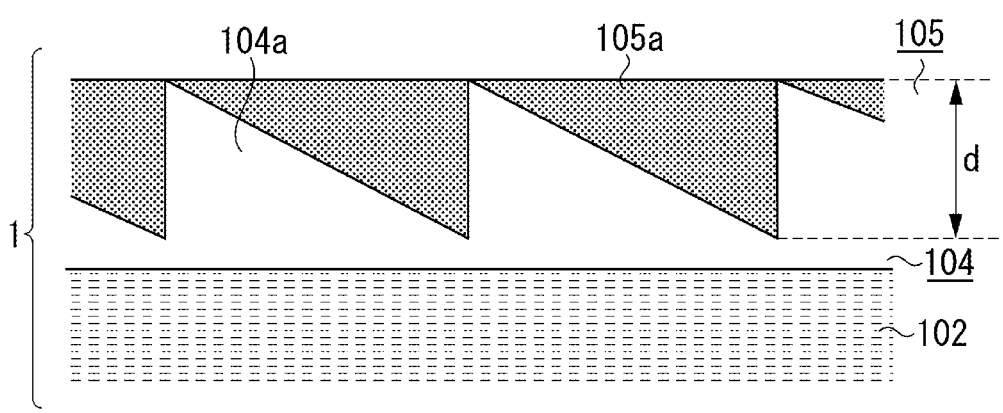

As understood from FIG. 9B, a laminated structure of diffractive optical element 1 having the diffraction gratings 104 and 105 is used, so that high diffraction efficiency of 95% can be obtained over the entire wavelength range (in this case, the visible range) in use for the design-order diffracted light. In addition, as a laminated structure of diffractive optical element 1, the grating thicknesses of the two layers 104 and 105 may be configured to be equal to the each other according to a combination of the materials as illustrated in FIG. 9C. In this case, two diffraction grating layers may be disposed to be separated by an air layer.

Although the diffractive optical portion is disposed on an optical surface (lens surface or substrate surface), the optical surface as a base may be spherical, flat, or aspherid. In addition, the diffractive optical portion may also be produced on a replica aspheric surface by using a method of attaching a plastic film or the like as a diffractive optical portion (diffracting surface) to the optical surface. With respect to the shape of the diffraction grating, when a phase coefficient of 2i-th term is denoted by $C_{2i}$, a phase φ (H) at a distance H from the optical axis is expressed by the following equation. Herein, m is a diffraction order, and $\lambda_0$ is a reference wavelength.

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}) \quad (a)$$

In general, an Abbe number (dispersion value) $v_d$ of a refractive optical material such as a lens and a prism is expressed by the following equation when refractive powers at the wavelengths of d-line, C-line, and F-line are denoted by $N_d$, $N_C$, and $N_F$, respectively.

$$v_d = (N_d - 1)/(N_F - N_C) > 0 \quad (b)$$

On the other hand, the Abbe number $v_d$ of the diffractive optical portion is expressed by the following equation, when the wavelengths of d-line, C-line, and F-line are denoted by $\lambda_d$, $\lambda_C$, and $\lambda_F$.

$$v_d = \lambda_d / (\lambda_F - \lambda_C) \quad (c)$$

As a result, $v_d = -3.45$. Therefore, the dispersion property at an arbitrary wavelength has a reverse functionality with respect to the diffractive optical element. In addition, when the coefficient of the quadratic term of the aforementioned equation (a) expressing a phase of the diffractive optical portion is denoted by $C_2$, the refractive power $\phi_D$ of a temporary paraxial diffracted light (m=1) at a reference wavelength of the diffractive optical portion is expressed as follows.

$$\phi_D = -2 \cdot C_2$$

In addition, when the arbitrary wavelength is denoted by $\lambda$ and the reference wavelength is denoted by $\lambda_0$, a change in refractive power at the arbitrary wavelength with respect to the reference wavelength is expressed by the following equation.

$$\phi_D' = (\lambda/\lambda_0) \times (-2 \cdot C_2) \quad (d)$$

Therefore, as a characteristic of the diffractive optical portion, it is possible to obtain large dispersion property with a weak paraxial diffractive power change by changing the phase coefficient $C_2$ of the aforementioned equation (a). This means that chromatic aberration is corrected without large influence on various aberrations other than chromatic aberration. In addition, with respect to higher-order coefficients following the phase coefficient $C_4$, it is possible to obtain an effect similar to that of an aspheric surface by a change in refractive power of the diffractive optical portion with respect to a change in incidence height of a ray.

At the same time, the refractive power at an arbitrary wavelength with respect to the reference wavelength can be changed according to a change in incidence height of a ray. Therefore, chromatic aberration of magnification can be effectively corrected. In addition, in the case where an on-axis ray passes through a lens surface, if the diffractive optical element is disposed at a position which is higher than the optical axis in the optical path on the surface, axial chromatic aberration can also be effectively corrected.

Hereinafter, Numerical Examples 1 to 7 corresponding to the first to seventh exemplary embodiments of the present invention will be described. In each Numerical Example, reference i denotes an order of a surface from the object side. A radius of curvature of the i-th surface from an object side is denoted by $r_i$, and a distance between the i-th and (i+1)-th surfaces from the object side is denoted by $d_i$. A refractive index and an Abbe number of the i-th optical member are denoted by $nd_i$ and $vd_i$, respectively. A focal length, an F-number, and an angle of view (degree) of an entire system of which the focus is aligned at an infinitely-distant object are denoted by f, fno, and $2\omega$, respectively. The diffractive optical element (diffracting surface) is expressed by providing phase coefficients of a phase function of the aforementioned equation (a). When the direction of an optical axis is set to an X axis, the direction perpendicular to the optical axis is set to an H axis, the propagation direction of the light is set to be positive, the paraxial radius of curvature is denoted by R, the conic constant is denoted by k, and aspheric coefficients are denoted by A4, A6, A8, and A10, the aspheric shape can be expressed by the following equation.

$$X = \frac{\left(\frac{H^2}{R}\right)}{\left\{1 + \sqrt{1-(1+K)\cdot\left(\frac{H}{R}\right)^2}\right\}} + A4\cdot H^4 + A6\cdot H^6 + A8\cdot H^8 + A10\cdot H^{10}$$

In Numerical Examples 1, 2, and 5, the UV curable resin 1 is used in a one-body state. In addition, in Numerical Example 6, N-polyvinyl carbazole is used in a one-body state. In Numerical Examples 3, 4, and 7, $TiO_2$ is used in a state where the material is dispersed in a host polymer, and the refractive index of the $TiO_2$ particle-dispersed material is calculated by using a value calculated by using the aforementioned Equation (A). In Numerical Example 3, the UV curable resin 1 is used as a host polymer, and the volume fraction of $TiO_2$ is 20%. In Numerical Examples 4 and 7, the UV curable resin 2 is used as a host polymer, and the volume fractions of $TiO_2$ are 20% and 3%, respectively. The relation between the aforementioned conditions and the numerical values in Numerical Examples is listed in Table-3.

NUMERICAL EXAMPLE 1

| | f = 293.50 mm Fno = 2.91 2ω = 8.44 | | | | | | |
|---|---|---|---|---|---|---|---|
| Surface number | r | d | nd | vd | Effective diameter | θgF | Specific gravity |
| 1 (Aspheric surface) | 86.799 | 17.42 | 1.48749 | 70.2 | 100.86 | 0.5300 | 2.46 |
| 2 | 1170.174 | 57.54 | | | 99.75 | | |
| 3 (Aspheric surface) | 95.497 | 10.28 | 1.48749 | 70.2 | 62.26 | 0.5300 | 2.46 |
| 4 (Diffraction) | −163.525 | 0.50 | 1.63555 | 22.7 | 60.68 | 0.6890 | NL |
| 5 | −139.346 | 2.80 | 1.80518 | 25.4 | 60.68 | 0.6161 | 3.37 |
| 6 | −4169.808 | 13.00 | | | 58.22 | | |
| 7 | −3960.048 | 2.10 | 1.48749 | 70.2 | 47.96 | 0.5300 | 2.46 |
| 8 | 49.618 | 38.66 | | | 44.24 | | |
| 9 (Stop) | ∞ | 8.51 | | | 34.90 | | |
| 10 | 122.383 | 1.80 | 1.84666 | 23.8 | 32.40 | 0.6205 | 3.54 |
| 11 | 37.899 | 7.58 | 1.72000 | 50.2 | 32.27 | 0.5521 | 3.86 |
| 12 | −138.202 | 0.95 | | | 32.38 | | |
| 13 | 133.119 | 4.25 | 1.84666 | 23.8 | 32.08 | 0.6205 | 3.54 |
| 14 | −168.053 | 1.65 | 1.60311 | 60.6 | 31.65 | 0.5415 | 3.43 |
| 15 | 33.273 | 6.05 | | | 30.3 | | |
| 16 | −62.910 | 1.60 | 1.77250 | 49.6 | 30.44 | 0.5520 | 4.23 |
| 17 | 138.723 | 2.82 | | | 32.04 | | |
| 18 (Flare cut) | ∞ | 0.00 | | | 33.76 | | |
| 19 | 79.073 | 9.30 | 1.61340 | 44.3 | 35.61 | 0.5633 | 2.93 |
| 20 | −45.556 | 2.00 | 1.59282 | 68.6 | 36.71 | 0.5441 | 4.20 |
| 21 | −281.212 | 3.80 | | | 38.35 | | |
| 22 | 114.450 | 6.40 | 1.61340 | 44.3 | 41.01 | 0.5633 | 2.93 |
| 23 | −164.077 | 8.00 | | | 41.38 | | |
| 24 | ∞ | 2.00 | 1.51633 | 64.1 | 41.64 | 0.5353 | 2.52 |
| 25 | ∞ | | | | 41.68 | | |

-continued f = 293.50 mm Fno = 2.91 2ω = 8.44

Aspheric surface data

1st surface k = −7.04052 × 10−1  A4 = 1.09837 × 10−7
A6 = 9.51229 × 10−12  A8 = 1.71280 × 10−16
A10 = 4.87447 × 10−20  A12 = 4.86819 × 10−23
A14 = −7.52648 × 10−27

3rd surface k = 4.45667  A4 = −9.89916 × 10−7  A6 = −3.40225 × 10−10
A8 = −2.60640 × 10−15  A10 = −2.16948 × 10−16
A12 = 1.56988 × 10−19  A14 = −8.32594 × 10−23

Phase coefficient data of diffractive optical element

4th surface (diffracting surface)

C2 = −1.10389 × 10−4  C4 = 1.08361 × 10−8  C6 = 7.38540 × 10−13
C8 = −8.27060 × 10−15  C10 = 3.92066 × 10−18

| | |
|---|---|
| Focal length | 293.50 |
| F-number | 2.91 |
| Angle of view | 4.22 |
| Image height | 21.64 |
| Total lens length | 265.45 |
| BF | 56.45 |
| Position of entrance pupil | 442.85 |
| Position of exit pupil | −68.29 |
| Front principal point position | 45.83 |
| Rear principal point position | −237.04 |

Data of lens unit

| Unit | Leading surface | Focal length | Lens structure length | Front principal point position | Rear principal point position |
|---|---|---|---|---|---|
| L1 | 1 | 133.72 | 88.54 | 29.90 | −58.69 |
| L1a | 1 | 191.31 | 17.42 | −0.93 | −12.58 |
| L1b | 3 | 289.30 | 13.58 | −3.42 | −12.07 |
| L2 | 7 | −100.51 | 2.10 | 1.39 | −0.02 |
| L3 | 9 | 324.78 | 66.71 | 65.95 | 14.47 |
| L31 | 9 | 115.07 | 17.88 | 11.37 | −2.60 |
| L32 | 13 | −35.02 | 13.55 | 8.28 | −2.03 |
| L33 | 18 | 54.93 | 31.49 | 7.08 | −17.74 |

Data of single lens

| Lens | Leading surface | Focal length |
|---|---|---|
| 1 | 1 | 191.31 |
| 2 | 3 | 122.04 |
| 3 | 4 | 1110.78 |
| 4 | 5 | −179.10 |
| 5 | 7 | −100.51 |
| 6 | 10 | −65.48 |
| 7 | 11 | 42.07 |
| 8 | 13 | 88.30 |
| 9 | 14 | −45.91 |
| 10 | 16 | −55.84 |
| 11 | 19 | 48.50 |
| 12 | 20 | −91.99 |
| 13 | 22 | 110.88 |
| 14 | 24 | 0.00 |

NUMERICAL EXAMPLE 2 f = 293.50 mm Fno = 2.91 2ω = 8.44

| Surface number | r | d | nd | vd | Effective diameter | θgF | Specific gravity |
|---|---|---|---|---|---|---|---|
| 1 (Aspheric surface) | 80.257 | 18.49 | 1.48749 | 70.2 | 100.86 | 0.5300 | 2.46 |
| 2 | 479.585 | 67.00 | | | 99.20 | | |
| 3 (Aspheric surface) | −1230.935 | 2.80 | 1.84666 | 23.8 | 59.00 | 0.6205 | 3.54 |
| 4 | 152.595 | 1.50 | 1.63555 | 22.7 | 57.42 | 0.6890 | NL |
| 5 (Diffraction) | 214.663 | 4.89 | 1.51742 | 52.4 | 57.25 | 0.5564 | 2.46 |
| 6 | 650.827 | 30.05 | | | 56.39 | | |
| 7 (Aspheric surface) | 85.844 | 5.00 | 1.57135 | 53.0 | 45.87 | 0.5553 | 2.98 |
| 8 | 213.266 | 11.06 | | | 44.63 | | |
| 9 (Stop) | ∞ | 8.51 | | | 39.43 | | |
| 10 | 291.471 | 1.80 | 1.84666 | 23.8 | 34.68 | 0.6205 | 3.54 |
| 11 | 41.386 | 6.23 | 1.72000 | 50.2 | 33.80 | 0.5521 | 3.86 |
| 12 | −432.721 | 0.95 | | | 33.70 | | |
| 13 | 182.284 | 4.25 | 1.84666 | 23.8 | 33.43 | 0.6205 | 3.54 |
| 14 | −70.642 | 1.65 | 1.60311 | 60.6 | 33.19 | 0.5415 | 3.43 |
| 15 | 46.279 | 5.54 | | | 31.54 | | |
| 16 | −63.470 | 1.60 | 1.77250 | 49.6 | 31.55 | 0.5520 | 4.23 |
| 17 | 83.612 | 2.82 | | | 32.76 | | |
| 18 (Flare cut) | ∞ | 5.16 | | | 33.72 | | |
| 19 | 149.49 | 9.30 | 1.61340 | 44.3 | 38.84 | 0.5633 | 2.93 |
| 20 | −53.659 | 2.00 | 1.59282 | 68.6 | 40.30 | 0.5441 | 4.20 |
| 21 | −125.077 | 3.18 | | | 41.77 | | |
| 22 (Aspheric surface) | 124.989 | 5.22 | 1.61772 | 49.8 | 44.25 | 0.5603 | 3.23 |
| 23 | −202.204 | 8.00 | | | 44.40 | | |
| 24 | ∞ | 2.00 | 1.51633 | 64.1 | 44.27 | 0.5353 | 2.52 |
| 25 | ∞ | | | | 44.25 | | |

Aspheric surface data

1st surface k = −1.33140  A4 = 3.05055 × 10−7  A6 = 8.38719 × 10−12
A8 = 7.73582 × 10−15  A10 = −2.61414 × 10−18
A12 = 6.08616 × 10−22  A14 = −4.38169 × 10−26

3rd surface k = 7.06927 × 102  A4 = −4.30619 × 10−7  A6 = 5.17360 × 10−11
A8 = −2.90910 × 10−13  A10 = 4.28669 × 10−16
A12 = −3.04311 × 10−19  A14 = 8.60493 × 10−23

7th surface k = 4.86641  A4 = −9.16281 × 10−7  A6 = −1.94715 × 10−10
A8 = −6.50810 × 10−13

22nd surface k = 4.46350  A4 = −2.61816 × 10−7  A6 = 9.35868 × 10−11
A8 = −1.36162 × 10−13

Phase coefficient data of diffractive optical element

5th surface (diffracting surface)

C2 = −9.42827 × 10−5  C4 = −1.37064 × 10−8
C6 = 5.28315 × 10−11  C8 = −8.88149 × 10−14  C10 = 4.19535 × 10−17

| | |
|---|---|
| Focal length | 293.50 |
| F-number | 2.91 |
| Angle of view | 4.22 |
| Image height | 21.64 |
| Total lens length | 274.07 |

-continued f = 293.50 mm Fno = 2.91 2ω = 8.44

| | |
|---|---|
| BF | 65.07 |
| Position of entrance pupil | 355.18 |
| Position of exit pupil | −78.32 |
| Front principal point position | 47.92 |
| Rear principal point position | −228.43 |

Data of lens unit

| Unit | Leading surface | Focal length | Lens structure length | Front principal point position | Rear principal point position |
|---|---|---|---|---|---|
| L1 | 1 | 303.72 | 94.68 | −85.12 | −134.35 |
| L1a | 1 | 194.77 | 18.49 | −2.46 | −14.70 |
| L1b | 3 | −308.72 | 9.19 | 2.31 | −3.3 |
| L2 | 7 | 247.93 | 5.00 | −2.11 | −5.25 |
| L3 | 9 | −606.04 | 68.22 | −132.96 | −248.64 |
| L31 | 9 | 660.97 | 16.53 | 11.60 | −1.52 |
| L32 | 13 | −37.83 | 13.04 | 9.04 | −0.85 |
| L33 | 18 | 60.70 | 34.86 | 12.76 | −15.54 |

Data of single lens

| Lens | Leading surface | Focal length |
|---|---|---|
| 1 | 1 | 194.77 |
| 2 | 3 | −160.20 |
| 3 | 4 | 712.54 |
| 4 | 5 | 552.31 |
| 5 | 7 | 247.93 |
| 6 | 10 | −57.16 |
| 7 | 11 | 52.75 |
| 8 | 13 | 60.60 |
| 9 | 14 | −46.12 |
| 10 | 16 | −46.49 |
| 11 | 19 | 65.51 |
| 12 | 20 | −160.19 |
| 13 | 22 | 125.81 |
| 14 | 24 | 0.00 |

NUMERICAL EXAMPLE 3 f = 195.47 mm Fno = 2.05 2ω = 12.64

| Surface number | r | d | nd | vd | Effective diameter | θgF | Specific gravity |
|---|---|---|---|---|---|---|---|
| 1 (Aspheric surface) | 74.436 | 20.65 | 1.48749 | 70.2 | 98.47 | 0.53 | 2.46 |
| 2 | 596.019 | 37.00 | | | 95.79 | | |
| 3 (Aspheric surface) | 71.314 | 12.00 | 1.48749 | 70.2 | 63.7 | 0.53 | 2.46 |
| 4 | −495.173 | 1.50 | 1.78927 | 17.6 | 60.57 | 0.794 | NL |
| 5 (Diffraction) | −322.110 | 4.00 | 1.80809 | 22.8 | 60.02 | 0.6307 | 3.29 |
| 6 | 264.782 | 3.10 | | | 56.21 | | |
| 7 (Flare cut) | ∞ | 4.50 | | | 54.84 | | |
| 8 | 652.539 | 2.84 | 1.80809 | 22.8 | 50.56 | 0.6307 | 3.29 |
| 9 | −326.330 | 3.00 | 1.72916 | 54.7 | 49.88 | 0.5444 | 4.18 |
| 10 | 49.503 | 25.99 | | | 45.03 | | |
| 11 (Stop) | ∞ | 4.44 | | | 41.45 | | |
| 12 (Aspheric surface) | 83.885 | 2.10 | 1.80809 | 22.8 | 40.24 | 0.6307 | 3.29 |
| 13 | 59.752 | 7.20 | 1.77250 | 49.6 | 39.29 | 0.5520 | 4.23 |
| 14 | 1544.962 | 2.89 | | | 38.03 | | |
| 15 | 261.072 | 1.75 | 1.69680 | 55.5 | 36.13 | 0.5434 | 3.70 |
| 16 | 58.113 | 4.73 | | | 34.70 | | |
| 17 | −79.915 | 4.92 | 1.84666 | 23.8 | 34.66 | 0.6191 | 3.50 |
| 18 | −41.626 | 1.80 | 1.54072 | 47.2 | 34.93 | 0.5651 | 2.52 |
| 19 | 84.513 | 3.12 | | | 34.36 | | |
| 20 | 101.663 | 6.54 | 1.78800 | 47.4 | 36.04 | 0.5559 | 4.3 |
| 21 | −57.108 | 2.00 | 1.80809 | 22.8 | 36.54 | 0.6307 | 3.29 |
| 22 | −272.172 | 0.20 | | | 37.68 | | |
| 23 | 77.436 | 4.74 | 1.80000 | 29.8 | 38.89 | 0.6017 | 3.68 |
| 24 | 229.569 | 3.40 | | | 38.77 | | |
| 25 | ∞ | 2.20 | 1.51633 | 64.1 | 38.96 | 0.5353 | 2.52 |
| 26 | ∞ | | | | 39.06 | | |

Aspheric surface data

1st surface k = 2.74083 × 10−1 A4 = −7.98932 × 10−8 A6 = −1.80103 × 10−11
A8 = −3.45214 × 10−15 A10 = −1.93575 × 10−18
A12 = 7.25251 × 10−22 A14 = −2.30955 × 10−25

3rd surface k = 7.70173 × 10−1 A4 = −8.19748 × 10−7 A6 = −2.86457 × 10−10
A8 = −6.31127 × 10−14 A10 = −7.04668 × 10−17
A12 = 4.05331 × 10−20 A14 = −1.03338 × 10−23

12th surface k = 1.48193 A4 = −1.01444 × 10−8 A6 = −3.36115 × 10−10
A8 = 1.88115 × 10−12 A10 = −4.07555 × 10−15
A12 = 2.82620 × 10−18

Phase coefficient data of diffractive optical element

5th surface (diffracting surface)

C2 = −8.71428 × 10−5 C4 = 5.59826 × 10−9 C6 = −1.89705 × 10−11

| | |
|---|---|
| Focal length | 195.47 |
| F-number | 2.05 |
| Angle of view | 6.32 |
| Image height | 21.64 |
| Total lens length | 226.51 |
| BF | 59.90 |
| Position of entrance pupil | 266.50 |
| Position of exit pupil | −49.47 |
| Front principal point position | 112.60 |
| Rear principal point position | −135.57 |

Data of lens unit

| Unit | Leading surface | Focal length | Lens structure length | Front principal point position | Rear principal point position |
|---|---|---|---|---|---|
| L1 | 1 | 117.46 | 75.14 | 15.86 | −49.55 |
| L1a | 1 | 172.25 | 20.65 | −1.96 | −15.66 |
| L1b | 3 | 278.67 | 17.50 | −10.39 | −20.73 |
| L2 | 7 | −75.85 | 10.34 | 8.17 | 0.34 |
| L3 | 11 | 123.02 | 52.03 | 29.14 | −11.29 |
| L31 | 11 | 116.71 | 13.74 | 4.05 | −5.59 |
| L32 | 15 | −51.63 | 13.20 | 3.79 | −5.66 |
| L33 | 20 | 58.69 | 19.08 | 2.24 | −10.24 |

Data of single lens

| Lens | Leading surface | Focal length |
|---|---|---|
| 1 | 1 | 172.25 |
| 2 | 3 | 128.77 |
| 3 | 4 | 923.84 |
| 4 | 5 | −185.11 |
| 5 | 8 | 269.55 |
| 6 | 9 | −58.75 |

| f = 195.47 mm Fno =2.05 2ω = 12.64 | | |
|---|---|---|
| 7 | 12 | −267.42 |
| 8 | 13 | 80.29 |
| 9 | 15 | −107.66 |
| 10 | 17 | 96.90 |
| 11 | 18 | −51.32 |
| 12 | 20 | 47.26 |
| 13 | 21 | −89.81 |
| 14 | 23 | 144.07 |
| 15 | 25 | 0.00 |

NUMERICAL EXAMPLE 4

| f = 390.39 mm Fno = 2.90 2ω = 6.34 | | | | | | | |
|---|---|---|---|---|---|---|---|
| Surface number | r | d | nd | vd | Effective diameter | θgF | Specific gravity |
| 1 (Aspheric surface) | 125.222 | 23.48 | 1.48749 | 70.2 | 134.62 | 0.5300 | 2.46 |
| 2 | 2501.770 | 85.00 | | | 132.66 | | |
| 3 (Aspheric surface) | 141.911 | 10.33 | 1.52249 | 59.8 | 82.46 | 0.5440 | 2.49 |
| 4 | −1255.204 | 2.00 | 1.70877 | 21.6 | 80.28 | 0.8170 | NL |
| 5 (Diffraction) | −439.172 | 3.00 | 1.80809 | 22.8 | 79.91 | 0.6307 | 3.29 |
| 6 | 834.723 | 13.51 | | | 77.38 | | |
| 7 | 334.440 | 5.25 | 1.80809 | 22.8 | 66.63 | 0.6307 | 3.29 |
| 8 | −989.979 | 3.20 | 1.88300 | 40.8 | 65.13 | 0.5667 | 5.52 |
| 9 (Aspheric surface) | 90.016 | 85.69 | | | 60.85 | | |
| 10 (Stop) | ∞ | 14.60 | | | 40.70 | | |
| 11 | −6387.585 | 1.80 | 1.80809 | 22.8 | 37.04 | 0.6307 | 3.29 |
| 12 | 60.384 | 8.07 | 1.75700 | 47.8 | 36.43 | 0.5565 | 4.08 |
| 13 | −146.918 | 4.62 | | | 36.87 | | |
| 14 | 71.558 | 6.16 | 1.84666 | 23.9 | 36.86 | 0.6218 | 3.78 |
| 15 | −150.033 | 1.70 | 1.60562 | 43.7 | 36.21 | 0.5721 | 2.91 |
| 16 | 34.545 | 6.05 | | | 33.90 | | |
| 17 | −99.225 | 1.80 | 1.80400 | 46.6 | 33.92 | 0.5571 | 4.76 |
| 18 | 94.061 | 2.85 | | | 35.11 | | |
| 19 (Aspheric surface) | 148.473 | 5.27 | 1.69895 | 30.1 | 37.06 | 0.6030 | 2.96 |
| 20 | −212.785 | 0.20 | | | 38.17 | | |
| 21 | 51.465 | 3.00 | 1.84666 | 23.9 | 40.55 | 0.6218 | 3.78 |
| 22 | 38.256 | 8.00 | 1.62004 | 36.3 | 39.83 | 0.5879 | 2.69 |
| 23 | 321.333 | 15 | | | 39.78 | | |
| 24 | ∞ | 2.20 | 1.51633 | 64.1 | 40.49 | 0.5353 | 2.52 |
| 25 | ∞ | | | | 40.56 | | |

Aspheric surface data

1st surface k = −4.43167 × 10−1 A4 = 1.61268 × 10−8 A6 = 9.42310 × 10−13
A8 = −6.75801 × 10−17 A10 = 8.58410 × 10−21
3rd surface k = −7.08791 A4 = 1.84605 × 10−7 A6 = −6.59868 × 10−11
A8 = 1.54827 × 10−14 A10 = −3.87964 × 10−18 A12 = 3.38607 × 10−22
9th surface k = 1.34573 A4 = −1.80792 × 10−7 A6 = −6.36440 × 10−11
A8 = 2.27896 × 10−14 A10 = −1.62800 × 10−17

| f = 390.39 mm Fno = 2.90 2ω = 6.34 |
|---|

19th surface k = −4.32469 A4 = 2.20868 × 10−7 A6 = 1.49483 × 10−10
A8 = −9.07192 × 10−13 A10 = 1.19746 × 10−15
Phase coefficient data of diffractive optical element
5th surface (diffracting surface)

C2 = −6.06867 × 10−5 C4 = 1.42322 × 10−9 C6 = −8.05073 × 10−13

| | |
|---|---|
| Focal length | 390.39 |
| F-number | 2.90 |
| Angle of view | 3.17 |
| Image height | 21.64 |
| Total lens length | 367.55 |
| BF | 54.78 |
| Position of entrance pupil | 882.95 |
| Position of exit pupil | −69.46 |
| Front principal point position | 46.61 |
| Rear principal point position | −335.61 |

Data of lens unit

| Unit | Leading surface | Focal length | Lens structure length | Front principal point position | Rear principal point position |
|---|---|---|---|---|---|
| L1 | 1 | 186.88 | 123.81 | 46.00 | −81.11 |
| L1a | 1 | 269.53 | 23.48 | −0.83 | −16.56 |
| L1b | 3 | 389.00 | 15.33 | −4.08 | −13.53 |
| L2 | 7 | −135.86 | 8.45 | 6.16 | 1.49 |
| L3 | 10 | 399.28 | 81.32 | 28.34 | −38.95 |
| L31 | 10 | 237.90 | 24.47 | 21.26 | 1.09 |
| L32 | 14 | −51.57 | 15.70 | 13.53 | 1.19 |
| L33 | 19 | 59.22 | 33.67 | 1.03 | −25.15 |

Data of single lens

| Lens | Leading surface | Focal length |
|---|---|---|
| 1 | 1 | 269.53 |
| 2 | 3 | 244.64 |
| 3 | 4 | 803.96 |
| 4 | 5 | −371.81 |
| 5 | 7 | 309.90 |
| 6 | 8 | −93.32 |
| 7 | 11 | −74.01 |
| 8 | 12 | 57.50 |
| 9 | 14 | 57.96 |
| 10 | 15 | −46.20 |
| 11 | 17 | −59.81 |
| 12 | 19 | 125.88 |
| 13 | 21 | −196.50 |
| 14 | 22 | 69.29 |
| 15 | 24 | 0.00 |

NUMERICAL EXAMPLE 5

| | f = 584.84 mm Fno = 4.12 2ω = 4.24 | | | | | | |
|---|---|---|---|---|---|---|---|
| Surface number | r | d | nd | vd | Effective diameter | θgF | Specific gravity |
| 1 (Aspheric surface) | 133.427 | 24.67 | 1.48749 | 70.2 | 141.95 | 0.5300 | 2.46 |
| 2 | −1019.993 | 2.00 | 1.63555 | 22.7 | 141.03 | 0.6890 | NL |
| 3 | −586.946 | 5.80 | 1.80809 | 22.8 | 140.97 | 0.6307 | 3.29 |
| 4 | −1412.474 | 130.00 | | | 138.76 | | |
| 5 (Aspheric surface) | 642.329 | 7.00 | 1.48749 | 70.2 | 62.09 | 0.5300 | 2.46 |
| 6 (Diffraction) | −213.297 | 5.00 | 1.80809 | 22.8 | 60.38 | 0.6307 | 3.29 |
| 7 | −2512.873 | 26.05 | | | 58.44 | | |
| 8 | −8474.083 | 3.60 | 1.58144 | 40.8 | 44.41 | 0.5774 | 2.59 |
| 9 | 90.900 | 49.00 | | | 42.39 | | |
| 10 (Stop) | ∞ | 7.01 | | | 31.05 | | |
| 11 | −803.223 | 2.00 | 1.84666 | 23.8 | 29.37 | 0.6205 | 3.54 |
| 12 | 33.607 | 8.17 | 1.61340 | 44.3 | 28.76 | 0.5633 | 2.93 |
| 13 | −65.822 | 1.98 | | | 28.78 | | |
| 14 | −78.420 | 3.66 | 1.84666 | 23.8 | 28.15 | 0.6205 | 3.54 |
| 15 | −33.715 | 1.65 | 1.60311 | 60.6 | 28.19 | 0.5415 | 3.43 |
| 16 | −199.945 | 2.00 | | | 28.55 | | |
| 17 | −70.848 | 1.60 | 1.80400 | 46.6 | 28.68 | 0.5571 | 4.76 |
| 18 | 87.764 | 3.55 | | | 29.76 | | |
| 19 | 75.353 | 5.30 | 1.69895 | 30.1 | 33.05 | 0.6030 | 2.96 |
| 20 | −111.716 | 12.85 | | | 33.58 | | |
| 21 | 207.345 | 4.00 | 1.69895 | 30.1 | 36.45 | 0.6030 | 2.96 |
| 22 | −5036.36 | 14.00 | | | 36.58 | | |
| 23 | ∞ | 2.00 | 1.51633 | 64.1 | 45.00 | 0.5353 | 2.52 |
| 24 | ∞ | | | | 45.00 | | |

Aspheric surface data

1st surface $k = 1.72083 \times 10^{-2}$ $A4 = -2.19607 \times 10^{-8}$
$A6 = -1.56152 \times 10^{-12}$ $A8 = 1.38863 \times 10^{-16}$
$A10 = -3.17443 \times 10^{-20}$ $A12 = 1.62842 \times 10^{-24}$
$A14 = 2.03719 \times 10^{-30}$ 5th surface $k = 9.37997 \times 10^{1}$ $A4 = -2.48472 \times 10^{-7}$
$A6 = 3.84656 \times 10^{-11}$ $A8 = -7.30184 \times 10^{-14}$
$A10 = 3.15535 \times 10^{-17}$ $A12 = 2.12258 \times 10^{-20}$
$A14 = -1.64997 \times 10^{-23}$ Phase coefficient data of diffractive optical element
6th surface (diffracting surface)

$C2 = -1.00227 \times 10^{-4}$ $C4 = 1.95086 \times 10^{-9}$
$C6 = -3.95065 \times 10^{-12}$
$C8 = 7.11598 \times 10^{-15}$ $C10 = -3.567.79 \times 10^{-18}$

| | |
|---|---|
| Focal length | 584.84 |
| F-number | 4.12 |
| Angle of view | 2.12 |
| Image height | 21.64 |
| Total lens length | 414.25 |
| BF | 91.37 |
| Position of entrance pupil | 1378.03 |
| Position of exit pupil | −71.23 |
| Front principal point position | −140.62 |
| Rear principal point position | −493.47 | f = 584.84 mm Fno = 4.12 2ω = 4.24

Data of lens unit

| Unit | Leading surface | Focal length | Lens structure length | Front principal point position | Rear principal point position |
|---|---|---|---|---|---|
| L1  | 1  | 270.95  | 174.47 | −8.71  | 161.14 |
| L1a | 1  | 265.15  | 32.47  | 1.17   | 19.96  |
| L1b | 3  | 4584.37 | 12.00  | 17.06  | 9.54   |
| L2  | 7  | −157.65 | 3.60   | 2.25   | −0.02  |
| L3  | 10 | 600.52  | 69.77  | 135.57 | 103.87 |
| L31 | 10 | 586.74  | 17.18  | 36.42  | 24.45  |
| L32 | 14 | −46.60  | 8.90   | 4.03   | −1.69  |
| L33 | 19 | 55.37   | 38.16  | 4.15   | −30.19 |

Data of single lens

| Lens | Leading surface | Focal length |
|---|---|---|
| 1  | 1  | 243.75   |
| 2  | 2  | 2171.35  |
| 3  | 3  | −1246.67 |
| 4  | 5  | 309.02   |
| 5  | 6  | −306.43  |
| 6  | 8  | −154.65  |
| 7  | 11 | −38.06   |
| 8  | 12 | 37.44    |
| 9  | 14 | 67.33    |
| 10 | 15 | −67.49   |
| 11 | 17 | −48.54   |
| 12 | 19 | 65.14    |
| 13 | 21 | 285.01   |
| 14 | 23 | 0.00     |

NUMERICAL EXAMPLE 6 f = 293.49 mm Fno = 2.91 2ω = 8.44

| Surface number | r | d | nd | vd | Effective diameter | θgF | Specific gravity |
|---|---|---|---|---|---|---|---|
| 1 (Aspheric surface) | 104.777 | 12.76 | 1.51742 | 52.4 | 100.86 | 0.5564 | 2.46 |
| 2 | 400.975 | 2.50 | 1.69591 | 17.7 | 99.70 | 0.6860 | NL |
| 3 (Diffraction) | 1255.347 | 3.00 | 1.51742 | 52.4 | 99.58 | 0.5564 | 2.46 |
| 4 | −2040.282 | 61.14 | | | 99.08 | | |
| 5 (Aspheric surface) | 215.633 | 8.65 | 1.51742 | 52.4 | 61.84 | 0.5564 | 2.46 |
| 6 | −135.124 | 2.80 | 1.92286 | 18.9 | 60.35 | 0.6495 | 3.58 |
| 7 | −234.673 | 11.55 | | | 59.25 | | |
| 8 | 731.125 | 2.10 | 1.59551 | 39.2 | 48.37 | 0.5803 | 2.63 |
| 9 | 55.221 | 34.47 | | | 45.12 | | |
| 10 (Stop) | ∞ | 8.51 | | | 36.92 | | |
| 11 | 104.882 | 1.80 | 1.80809 | 22.8 | 34.18 | 0.6307 | 3.29 |
| 12 | 41.625 | 7.34 | 1.72916 | 54.7 | 33.80 | 0.5444 | 4.18 |
| 13 | −202.335 | 0.95 | | | 33.73 | | |
| 14 | 113.601 | 4.25 | 1.84666 | 23.8 | 33.26 | 0.6205 | 3.54 |
| 15 | −116.377 | 1.65 | 1.59282 | 68.6 | 32.84 | 0.5441 | 4.20 |
| 16 | 38.307 | 5.77 | | | 30.97 | | |
| 17 | −85.387 | 1.60 | 1.83481 | 42.7 | 30.99 | 0.5642 | 4.73 |
| 18 | 63.456 | 2.82 | | | 31.90 | | |
| 19 (Flare cut) | ∞ | 0.00 | | | 32.59 | | |
| 20 | 82.169 | 9.30 | 1.60342 | 38.0 | 34.16 | 0.5835 | 2.63 |
| 21 | −37.813 | 2.00 | 1.59282 | 68.6 | 35.20 | 0.5441 | 4.20 |
| 22 | −288.823 | 5.14 | | | 37.05 | | |
| 23 | 59.214 | 7.67 | 1.43387 | 95.1 | 41.23 | 0.5373 | 3.18 |
| 24 | −279.556 | 8.00 | | | 41.43 | | |
| 25 | ∞ | 2.00 | 1.51633 | 64.1 | 41.68 | | |
| 26 | ∞ | | | | 41.71 | | |

Aspheric surface data

1st surface $k = -1.35291$ $A4 = 9.07903 \times 10-8$ $A6 = -5.83046 \times 10-12$
$A8 = 1.03395 \times 10-15$ $A10 = 8.95844 \times 10-19$
$A12 = -4.71863 \times 10-22$ $A14 = 6.36776 \times 10-26$ 5th surface $k = 6.14584$ $A4 = -3.78674 \times 10-7$ $A6 = 6.15984 \times 10-11$
$A8 = -1.03031 \times 10-13$ $A10 = 1.40254 \times 10-16$
$A12 = -1.05336 \times 10-19$ $A14 = 3.29441 \times 10-23$ Phase coefficient data of diffractive optical element 3rd surface (diffracting surface)

$C2 = -4.79606 \times 10-5$ $C4 = 5.15707 \times 10-9$
$C6 = -2.52893 \times 10-12$ $C8 = 1.19413 \times 10-15$
$C10 = -1.82457 \times 10-19$

| | |
|---|---|
| Focal length | 293.49 |
| F-number | 2.91 |
| Angle of view | 4.22 |
| Image height | 21.64 |
| Total lens length | 262.73 |
| BF | 54.94 |
| Position of entrance pupil | 403.11 |
| Position of exit pupil | −66.55 |

-continued f = 293.49 mm Fno = 2.91 2ω = 8.44

| | |
|---|---|
| Front principal point position | −12.40 |
| Rear principal point position | −238.55 |

Data of lens unit

| Unit | Leading surface | Focal length | Lens structure length | Front principal point position | Rear principal point position |
|---|---|---|---|---|---|
| L1 | 1 | 133.93 | 90.86 | 34.61 | −59.65 |
| L1a | 1 | 180.90 | 18.26 | 1.09 | −10.84 |
| L1b | 5 | 301.02 | 11.45 | 3.35 | −3.87 |
| L2 | 8 | −100.42 | 2.10 | 1.43 | 0.11 |
| L3 | 10 | 400.43 | 68.81 | 54.32 | −3.70 |
| L31 | 10 | 107.41 | 17.65 | 10.34 | −3.48 |
| L32 | 14 | −34.88 | 13.27 | 9.58 | −0.62 |
| L33 | 19 | 57.46 | 34.11 | 7.53 | −20.10 |

Data of single lens

| Lens | Leading surface | Focal length |
|---|---|---|
| 1 | 1 | 270.16 |
| 2 | 2 | 802.90 |
| 3 | 3 | 1313.31 |
| 4 | 5 | 161.91 |
| 5 | 6 | −349.88 |
| 6 | 8 | −100.42 |
| 7 | 11 | −86.50 |
| 8 | 12 | 47.95 |
| 9 | 14 | 68.48 |
| 10 | 15 | −48.42 |
| 11 | 17 | −43.39 |
| 12 | 20 | 44.20 |
| 13 | 21 | −73.61 |
| 14 | 23 | 113.40 |
| 15 | 25 | 0.00 |

NUMERICAL EXAMPLE 7 f = 390.10 mm Fno = 2.90 2ω = 6.34

| Surface number | r | d | nd | vd | Effective diameter | θgF | Specific gravity |
|---|---|---|---|---|---|---|---|
| 1 (Aspheric surface) | 130.753 | 23.93 | 1.52249 | 59.8 | 134.52 | 0.5440 | 2.49 |
| 2 (Diffraction) | −4986.263 | 5.50 | 1.92286 | 18.9 | 132.58 | 0.6495 | 3.58 |
| 3 | ∞ | 80.00 | | | 130.76 | | |
| 4 (Aspheric surface) | 116.970 | 11.85 | 1.51742 | 52.4 | 78.47 | 0.5564 | 2.46 |
| 5 | −426.615 | 1.70 | 1.55324 | 39.8 | 76.19 | 0.6650 | NL |
| 6 | −225.276 | 3.00 | 1.74077 | 27.8 | 76.09 | 0.6095 | 3.10 |
| 7 | 305.842 | 22.7 | | | 72.07 | | |
| 8 | 1475.657 | 3.60 | 1.80809 | 22.8 | 58.06 | 0.6307 | 3.29 |
| 9 | −319.286 | 3.20 | 1.88300 | 40.8 | 57.30 | 0.5667 | 5.52 |
| 10 (Aspheric surface) | 104.100 | 80.28 | | | 54.42 | | |
| 11 (Stop) | ∞ | 5.67 | | | 40.55 | | |
| 12 | 133.801 | 2.18 | 1.84666 | 23.8 | 39.26 | 0.6191 | 3.50 |
| 13 | 59.035 | 8.63 | 1.65160 | 58.5 | 38.34 | 0.5425 | 3.73 |
| 14 | −129.184 | 11.59 | | | 37.6 | | |
| 15 | 120.042 | 5.12 | 1.84666 | 23.8 | 33.66 | 0.6205 | 3.54 |
| 16 | −99.623 | 1.90 | 1.72 | 50.2 | 33.24 | 0.5521 | 3.86 |
| 17 | 37.620 | 4.28 | | | 31.86 | | |
| 18 | −249.579 | 1.67 | 1.88300 | 40.8 | 31.94 | 0.5667 | 5.52 |
| 19 | 87.083 | 2.70 | | | 32.83 | | |
| 20 | 71.942 | 5.50 | 1.75520 | 27.5 | 35.86 | 0.6103 | 3.15 |
| 21 | −913.646 | 4.85 | | | 36.54 | | |
| 22 (Aspheric surface) | 44.669 | 6.98 | 1.762 | 40.1 | 40.00 | 0.5765 | 4.22 |
| 23 | 913.315 | 1.87 | 1.80809 | 22.8 | 39.45 | 0.6307 | 3.29 |
| 24 | 71.162 | 3.00 | | | 38.56 | | |
| 25 | ∞ | 2.20 | 1.48749 | 70.2 | 38.58 | 0.5300 | 2.46 |
| 26 | ∞ | | | | 38.69 | | |

Aspheric surface data

1st surface $k = 3.10997 \times 10^{-1}$ $A4 = -1.88211 \times 10^{-8}$
$A6 = -1.63207 \times 10^{-12}$ $A8 = -8.69191 \times 10^{-17}$
$A10 = -4.64788 \times 10^{-21}$ $A12 = -2.75696 \times 10^{-24}$
$A14 = 2.40295 \times 10^{-28}$ 4th surface $k = -7.21555 \times 10^{-1}$ $A4 = -5.31484 \times 10^{-8}$
$A6 = -2.35702 \times 10^{-11}$ $A8 = -6.48716 \times 10^{-17}$
$A10 = 1.12513 \times 10^{-18}$ $A12 = 1.38670 \times 10^{-22}$
$A14 = -2.35317 \times 10^{-25}$ 10th surface $k = -9.18761 \times 10^{-1}$ $A4 = 1.66322 \times 10^{-7}$
$A6 = -4.12914 \times 10^{-12}$ $A8 = -2.47961 \times 10^{-14}$
$A10 = 9.74885 \times 10^{-17}$ $A12 = -5.30167 \times 10^{-20}$
$A14 = -4.77088 \times 10^{-24}$ 22nd surface $k = -3.74658 \times 10^{-1}$ $A4 = -2.56192 \times 10^{-7}$
$A6 = 1.06635 \times 10^{-9}$ $A8 = -8.09059 \times 10^{-12}$
$A10 = 2.93722 \times 10^{-14}$ $A12 = -5.00137 \times 10^{-17}$
$A14 = 3.25128 \times 10^{-20}$ Phase coefficient data of diffractive optical element
2nd surface (diffracting surface)

$C2 = -2.35220 \times 10^{-5}$ $C4 = 5.66764 \times 10^{-10}$ $C6 = -2.51468 \times 10^{-14}$

| | |
|---|---|
| Focal length | 390.10 |
| F-number | 2.90 |
| Angle of view | 3.17 |
| Image height | 21.64 |
| Total lens length | 364.18 |
| BF | 60.28 |
| Position of entrance pupil | 984.84 |
| Position of exit pupil | −53.29 |
| Front principal point position | 35.02 |
| Rear principal point position | −329.82 |

Data of lens unit

| Unit | Leading surface | Focal length | Lens structure length | Front principal point position | Rear principal point position |
|---|---|---|---|---|---|
| L1 | 1 | 206.69 | 125.98 | 17.72 | −95.25 |
| L1a | 1 | 252.47 | 29.43 | −0.15 | −18.72 |
| L1b | 4 | 819.72 | 16.55 | −27.85 | −37.23 |
| L2 | 8 | −122.62 | 6.80 | 3.90 | 0.20 |
| L3 | 11 | 271.30 | 68.13 | 0.06 | −53.23 |
| L31 | 11 | 125.40 | 16.48 | 9.24 | −2.93 |
| L32 | 15 | −41.15 | 12.97 | 8.07 | −1.14 |
| L33 | 20 | 55.36 | 24.39 | −0.01 | −16.76 |

-continued f = 390.10 mm Fno = 2.90 2ω = 6.34

Data of single lens

| Lens | Leading surface | Focal length |
|---|---|---|
| 1 | 1 | 241.64 |
| 2 | 2 | −7020.44 |
| 3 | 4 | 178.75 |
| 4 | 5 | 868.65 |
| 5 | 6 | −174.70 |
| 6 | 8 | 325.12 |
| 7 | 9 | −88.59 |
| 8 | 12 | −126.48 |
| 9 | 13 | 63.33 |
| 10 | 15 | 65.00 |
| 11 | 16 | −37.71 |
| 12 | 18 | −72.94 |
| 13 | 20 | 88.52 |
| 14 | 22 | 61.42 |
| 15 | 23 | −95.60 |
| 16 | 25 | 0.00 |

TABLE 1

| | Numerical Example | | | | |
|---|---|---|---|---|---|
| | 1, 2, 5 UV Curable Resin 1 | 3 TiO₂ 20% - UV Curable Resin 1 | 4 TiO₂ 20% - UV Curable Resin 2 | 6 N-polyvinyl carbazole | 7 TiO₂ 3% - UV Curable Resin 2 |
| d-Line Refractive Index | 1.63555 | 1.78927 | 1.70877 | 1.69591 | 1.55324 |
| g-Line Refractive Index | 1.67532 | 1.85809 | 1.75988 | 1.75164 | 1.57249 |
| C-Line Refractive Index | 1.62807 | 1.77777 | 1.70033 | 1.68528 | 1.54936 |
| F-Line Refractive Index | 1.65604 | 1.82254 | 1.7331 | 1.72465 | 1.56326 |
| νd | 22.7 | 17.6 | 21.6 | 17.7 | 39.8 |
| θgF | 0.689 | 0.794 | 0.817 | 0.686 | 0.665 |

TABLE 2

| | UV Curable Resin 2 | TiO₂ |
|---|---|---|
| d-Line Refractive Index | 1.52415 | 2.30377 |
| g-Line Refractive Index | 1.53706 | 2.45676 |
| C-Line Refractive Index | 1.52116 | 2.28032 |
| F-Line Refractive Index | 1.53133 | 2.37452 |
| νd | 51.6 | 13.8 |
| θgF | 0.563 | 0.873 |

TABLE 3

| Condition | Numerical Example | | | |
|---|---|---|---|---|
| | 1 | 2 | 3 | 4 |
| (1) | 373 | 47 | 458 | 210 |
| (2) | 0.0647 | 0.0647 | 0.1505 | 0.1887 |
| (3) | 1.48749 | 1.48749 | 1.48749 | 1.48749 |
| | 1.48749 | 1.84660 | 1.48749 | 1.52249 |
| | 1.80518 | 1.51742 | 1.80810 | 1.80810 |
| (4) | 70.2 | 70.2 | 70.2 | 70.2 |
| | 70.2 | 52.4 | 70.2 | 59.8 |
| (5) | 25.4 | 23.8 | 22.8 | 22.8 |
| | — | — | — | — |
| (6) | 22.7 | 22.7 | 17.6 | 21.6 |
| (7) | 0.0745 | 0.0840 | 0.0797 | 0.0797 |
| (8) | 0.661 | −0.631 | 0.618 | 0.693 |
| (9) | 15.4 | 18.1 | 29.4 | 21.1 |
| (10) | 3.1 | 6.4 | 5.2 | 9.2 |
| (11) | 0.527 | 0.518 | 0.554 | 0.499 |
| (12) | 0.0471 | 0.1223 | 0.0630 | 0.0521 |
| (13) | 1.33 | 1.23 | 1.55 | 1.38 |
| (14) | 0.31 | 0.41 | 0.62 | 0.34 |
| (15) | 0.34 | 0.84 | 0.39 | 0.35 |
| (16) | 1.11 | 2.06 | 0.63 | 1.02 |
| (17) | 0.39 | 2.25 | 0.60 | 0.61 |
| (18) | −0.12 | −0.13 | −0.26 | −0.13 |
| (19) | 0.19 | 0.21 | 0.30 | 0.15 |

| Condition | Numerical Example | | |
|---|---|---|---|
| | 5 | 6 | 7 |
| (1) | 148 | 505 | 432 |
| (2) | 0.0647 | 0.0429 | 0.0902 |
| (3) | 1.48749 | 1.51742 | 1.52249 |
| | 1.80810 | 1.51742 | 1.92286 |
| | 1.48749 | 1.51742 | 1.51742 |
| | 1.80810 | 1.92286 | 1.74077 |
| (4) | 70.2 | 52.4 | 59.8 |
| | 70.2 | 52.4 | 52.4 |
| | — | 52.4 | — |
| (5) | 22.8 | 18.9 | 18.9 |
| | 22.8 | — | 27.8 |
| (6) | 22.7 | 17.7 | 39.8 |
| (7) | 0.0762 | 0.0800 | 0.0757 |
| (8) | −0.058 | 0.601 | 0.308 |
| (9) | 8.5 | 35.5 | 54.5 |
| (10) | 2.3 | 12.0 | 24.5 |
| (11) | 0.535 | 0.558 | 0.533 |
| (12) | 0.0551 | 0.0530 | 0.0579 |
| (13) | 1.75 | 1.33 | 1.69 |
| (14) | 0.26 | 0.25 | 0.45 |
| (15) | 0.26 | 0.34 | 0.31 |
| (16) | 1.03 | 1.36 | 0.70 |
| (17) | 1.00 | 0.37 | 0.32 |
| (18) | −0.08 | −0.12 | −0.11 |
| (19) | 0.09 | 0.20 | 0.14 |

Next, an example where a photographic optical system according to an exemplary embodiment of the present invention is applied to an image pickup apparatus (camera system) will be described with reference to FIG. 10. FIG. 10 is a schematic view illustrating main components of a single-lens reflex camera. In FIG. 10, reference numeral "10" denotes a photographic lens including a photographic optical system 1 according to any one of Examples 1 to 7. The photographic optical system 1 is held by a lens barrel 2, which is a holding member. Reference numeral "20" denotes a camera body. The camera body 20 includes a quick return mirror 3, which reflects a light flux from the photographic lens 10 upwards, a focusing screen 4, which is disposed at an image formation position of the photographic optical system 1, and a pentagonal roof prism 5, which converts a reversed image formed on the focusing screen 4 into an erected image.

The camera body 20 further includes an eyepiece lens 6 for observing the erected image. Reference numeral "7" denotes a photosensitive surface where a solid-state image sensor (photoelectric conversion element), such as a CCD sensor or a CMOS sensor, or a silver halide film is disposed. During photographing, the quick return mirror 3 is retracted from the optical path, and an image is formed on the photosensitive surface 7 by the photographic optical system 1. In this manner, the photographic optical systems according to the first to seventh exemplary embodiments can be applied to a photographic camera, a video camera, a digital still camera, or the like, so that an image pickup apparatus having light weight and high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-051367 filed Mar. 9, 2011, which is hereby incorporated by reference herein in its entirety.

What is claimed is:

1. A photographic optical system comprising, along an optical axis thereof and arranged in order from an object side to an image side:
   a first lens unit having a positive refractive power;
   a second lens unit having a positive or negative refractive power; and
   a third lens unit having a positive or negative refractive power, focusing being performed by moving the second lens unit in a direction parallel to the optical axis,
   wherein at least one diffractive optical element and at least one optical element made of solid material are provided closer to the object side than a position where a paraxial chief ray intersects the optical axis, and
   wherein, when a focal length obtained by only a diffraction component of the diffractive optical element is denoted by fDOE, a focal length of the optical element made of solid material is denoted by fNL, a focal length of the first lens unit is denoted by f1, and a relative anomalous partial dispersion of a material forming the optical element made of solid material is denoted by $\Delta\theta gF_{NL}$, the following conditions are satisfied:

$10 < fDOE \times fNL/f1^2 < 600$ $0.0272 < \Delta\theta gF_{NL} < 0.3000$.

2. The photographic optical system according to claim 1, wherein, when a d-line refractive index and Abbe number of a material of a lens included in the first lens unit other than the optical element made of solid material are denoted by $N_{d1}$ and $v_{d1}$, respectively, a d-line Abbe number of a material of a positive lens included in the first lens unit other than the optical element made of solid material is denoted by $v_{d1P}$, a d-line Abbe number of a material of a negative lens included in the first lens unit is denoted by $v_{d1N}$, and a d-line Abbe number of a material of the optical element made of solid material is denoted by $v_{dNL}$, the following conditions are satisfied:

$8.986 \times 10^{-9} \times v_{d1}^4 - 5.469 \times 10^{-6} \times v_{d1}^3 + 8.088 \times 10^{-4} \times v_{d1}^2 - 4.553 \times 10^{-2} \times v_{d1} + 2.285 < N_{d1} < 3.384 \times 10^{-8} \times v_{d1}^4 - 1.348 \times 10^{-3} \times v_{d1}^3 + 1.761 \times 10^{-3} \times v_{d1}^2 - 9.477 \times 10^{-2} \times v_{d1} + 3.363$ $30.0 < v_{d1P} < 75.0$ $10.0 < v_{d1N} < 40.0$ $5.0 < v_{dNL} < 60.0$.

3. The photographic optical system according to claim 1, wherein the first lens unit includes a first lens sub-unit having a positive refractive power and a second lens sub-unit having a positive or negative refractive power, which are separated by the widest air distance, and
   wherein, when an axial length from the most object-side lens surface of the entire photographic optical system to an image plane is denoted by L, an air distance between the first lens sub-unit and the second lens sub-unit is denoted by d1ab, a focal length of the first lens sub-unit is denoted by f1a, a focal length of the second lens sub-unit is denoted by f1b, a focal length of the entire photographic optical system is denoted by f, and an F-number of the entire photographic optical system when an object distance is infinite is denoted by Fno, the following conditions are satisfied:

$0.0500 < d1ab/(L \times Fno) < 0.2000$ $-1.000 < f1a/f1b < 1.000$ $5.0 < fDOE/f < 200.0$ $1.0 < fDOE/fNL < 40.0$.

4. The photographic optical system according to claim 1, wherein the first lens unit includes a first lens sub-unit having a positive refractive power and a second lens sub-unit having a positive or negative refractive power, which are separated by the widest air distance, and
   wherein, when an air distance between the first lens sub-unit and the second lens sub-unit is denoted by d1ab, a focal length of the first lens sub-unit is denoted by f1a, a focal length of the second lens sub-unit is denoted by f1b, a focal length of the entire photographic optical system is denoted by f, and an F-number of the entire photographic optical system when an object distance is infinite is denoted by Fno, the following conditions are satisfied:

$0.460 < f/(f1a \times Fno) < 1.000$ $0.0430 < \{(f1/f1a) \times d1ab\}/(f \times Fno) < 0.3000$.

5. The photographic optical system according to claim 1, wherein, when a focal length of the second lens unit is denoted by f2, the following condition is satisfied:

$0.50 < |f1/f2| < 2.20$.

6. The photographic optical system according to claim 1, wherein, when a focal length of the second lens unit is denoted by f2 and a focal length of the third lens unit is denoted by f3, the following condition is satisfied:

$0.10 < |f2/f3| < 1.00$.

7. The photographic optical system according to claim 1, wherein, when a focal length of the second lens unit is denoted by f2, a focal length of the third lens unit is denoted by f3, and a focal length of the entire photographic optical system is denoted by f, the following conditions are satisfied:

$0.10 < |f2/f| < 2.00$ $0.30 < |f3/f| < 10.00$.

8. The photographic optical system according to claim 1, wherein the first lens unit includes a first lens sub-unit having a positive refractive power and a second lens sub-unit having a positive or negative refractive power, which are separated by the widest air distance, wherein the first lens sub-unit includes one positive lens or two lenses, and wherein the second lens sub-unit includes one positive lens and one negative lens.

9. The photographic optical system according to claim 1, further comprising an aperture stop located between the second lens unit and the third lens unit.

10. The photographic optical system according to claim 1, wherein a diffractive optical portion of the diffractive optical element is formed on a cemented surface of two lenses.

11. The photographic optical system according to claim 1, wherein a composite refractive power of the first lens unit and the second lens unit is positive, wherein the third lens unit includes a first lens sub-unit having a positive refractive power, a second lens sub-unit having a negative refractive power, and a third lens sub-unit having a positive refractive power, and wherein an image forming position of a photographed image is shifted by moving the second lens sub-unit to have a component perpendicular to an optical axis.

12. The photographic optical system according to claim 11, wherein when a focal length of the first lens sub-unit, a focal length of the second lens sub-unit, and a focal length of the third lens sub-unit are denoted by f31, f32, and f33, respectively, and a focal length of the entire photographic optical system is denoted by f, the following conditions are satisfied:

$0.10 < f31/f < 3.00$ $-0.50 < f32/f < -0.05$ $0.05 < f33/f < 0.50$.

13. An image pickup apparatus comprising:

a photographic optical system 1; and a solid-state image sensor configured to receive an image formed by the photographic optical system, the photographic optical system comprising along an optical axis therof and arranged in order from an object side to an image side;

a first lens unit having a positive refractive power;

a second lens unit having a positive or negative refractive power; and a third lens unit having a positive or negative refractive power, focusing being performed by moving the second lens unit in a direction parallel to the optical axis, wherein at least one diffractive optical element and at least one optical element made of solid material are provided closer to the object side than a position where a paraxial chief ray intersects the optical axis, and wherein, when a focal length obtained by only a diffraction component of the diffractive optical element is denoted by fDOE, a focal length of the optical element made of solid material is denoted by fNL, a focal length of the first lens unit is denoted by f1, and a relative anomalous partial dispersion of a material forming the optical element made of solid material is denoted by $\Delta\theta gF_{NL}$, the following conditions are satisfied:

$10 < fDOE \times fNL/f1^2 < 600$ $0.0272 < \Delta\theta gF_{NL} < 0.3000$.

\* \* \* \* \*